US011978294B2

(12) United States Patent
Min

(10) Patent No.: US 11,978,294 B2
(45) Date of Patent: May 7, 2024

(54) MULTI-FACTOR AUTHENTICATION ELECTRONIC LOCK SYSTEMS AND METHODS OF USING THE SAME

(71) Applicant: NANJING EASTHOUSE ELECTRICAL CO., LTD., Nanjing (CN)

(72) Inventor: Hao Min, Nanjing (CN)

(73) Assignee: NANJING EASTHOUSE ELECTRICAL CO., LTD., Nanjing (CN)

( * ) Notice: Subject to any disclaimer, the term of this patent is extended or adjusted under 35 U.S.C. 154(b) by 0 days.

(21) Appl. No.: 17/257,002

(22) PCT Filed: Dec. 29, 2020

(86) PCT No.: PCT/CN2020/140906

§ 371 (c)(1),
(2) Date: Dec. 30, 2020

(87) PCT Pub. No.: WO2022/141067

PCT Pub. Date: Jul. 7, 2022

(65) Prior Publication Data

US 2023/0334924 A1 Oct. 19, 2023

(51) Int. Cl.
*G07C 9/00* (2020.01)

(52) U.S. Cl.
CPC .................... *G07C 9/00563* (2013.01); *G07C 2009/00634* (2013.01); *G07C 2209/14* (2013.01); *G07C 2209/63* (2013.01)

(58) Field of Classification Search
CPC ...... G01S 17/931; G01S 7/4815; H01S 5/183; H01S 5/423
See application file for complete search history.

(56) References Cited

U.S. PATENT DOCUMENTS

2004/0178892 A1* 9/2004 Anderson ............ B60Q 1/2665 340/435
2008/0061927 A1* 3/2008 Manton .............. G07C 9/00563 340/5.7

(Continued)

*Primary Examiner* — Nabil H Syed
*Assistant Examiner* — Cal J Eustaquio
(74) *Attorney, Agent, or Firm* — Ming Jiang; MM IP SERVICES LLC

(57) ABSTRACT

Present disclosure relates a multi-factor authentication electronic lock, a multi-factor authentication electronic lock system, and methods of using the multi-factor authentication electronic lock system. The multi-factor authentication electronic lock includes a user presence detection system, a biometrics authentication system, and a multi-factor authentication electronic lock controller. When a user approaches the multi-factor authentication electronic lock, the user presence detection system detects the presence of user and authenticates the user detected to determine whether the user detected is an authorized user registered. Once the user is determined to be the authorized users registered, the rest of the multi-factor authentication electronic lock including the biometrics authentication system and the multi-factor authentication electronic lock controller is powered on, and biometrics authentication system further authenticates the authorized user detected, and the multi-factor authentication electronic lock is operable only when the authorized user detected is authenticated again by the biometrics authentication system.

16 Claims, 9 Drawing Sheets

(56) References Cited

U.S. PATENT DOCUMENTS

| | | | | |
|---|---|---|---|---|
| 2015/0105782 | A1* | 4/2015 | D'Lima | A61B 17/025<br>606/90 |
| 2016/0039340 | A1* | 2/2016 | Schantz | B60Q 9/008<br>340/435 |
| 2019/0077372 | A1* | 3/2019 | Greenberg | B60K 35/00 |
| 2022/0171063 | A1* | 6/2022 | Urano | G06V 20/58 |

* cited by examiner

MULTI-FACTOR AUTHENTICATION ELECTRONIC LOCK SYSTEMS AND METHODS OF USING THE SAME

FIELD

The present disclosure generally relates to electronic lock, and more particularly to multi-factor authentication electronic locks, multi-factor authentication electronic lock systems and methods of using the secure electronic lock systems.

BACKGROUND

Many electronic door locks are powered by batteries, and the battery life for these electronic locks is not very long. Currently, on the market, most electronic door locks are fingerprint electronic locks, finger vein electronic locks, facial recognition electronic locks, and keypad electronic locks. These electronic locks use only one type of authentication methods and they are easy to defeat. For example, fingerprint can be copied, and user can be forced to use his fingerprint or finger vein under gun point. A user's face can be forged using a facemask, and passcode can be stolen using video cameras nearby. Therefore, a new electronic lock having low power consumption and enhanced security is desirable.

Therefore, heretofore unaddressed needs still exist in the art to address the aforementioned deficiencies and inadequacies.

SUMMARY

In one aspect, present disclosure relates to a multi-factor authentication electronic lock. In certain embodiments, the multi-factor authentication electronic lock includes: a user presence detection system, a biometrics authentication system, and a multi-factor authentication electronic lock controller.

In certain embodiment, the multi-factor authentication electronic lock controller includes a battery. The multi-factor authentication electronic lock controller is used to register a group of authorized users, to store user profiles of the group of authorized users registered, and to manage the operation of the multi-factor authentication electronic lock.

In certain embodiment, the user presence detection system is powered by the battery constantly and the user presence detection system detects presence of a user using one of a set of user presence detection devices of the user presence detection system, and preliminarily authenticates the user detected to be one of the group of authorized user registered using one of a set of preliminary user authentication devices of the user presence detection system.

In certain embodiments, the biometrics authentication system further authenticates the authorized user detected using one of a set of biometrics authentication devices, and the biometrics authentication system is powered on after the authorized user has been detected by the user presence detection device and preliminarily authenticated to be one of the group of authorized users registered.

When the user approaches the multi-factor authentication electronic lock, the user presence detection system detects whether the user is one of the group of authorized users registered, once the user is determined to be one of the group of authorized users registered, the biometrics authentication system and the rest of the multi-factor authentication electronic lock are powered on, and the biometrics authentication system further authenticates the authorized user detected, and the multi-factor authentication electronic lock is operable only when the authorized user detected is authenticated again by the biometrics authentication system.

In certain embodiments, the user presence detection system includes: a set of user presence detection devices, and a set of preliminary user authentication devices. The set of user presence detection devices includes: a passive infrared (PIR) motion sensor; a radio frequency doppler (RFD) motion sensor; and a video camera having object detection ability. These user presence detection devices detect that the user is approaching and within a predetermined distance of the multi-factor authentication electronic lock. The set of preliminary user authentication devices includes: a keypad to enter user identification number (UID), and a Bluetooth user authentication module in communication with a handheld mobile communication device of the user detected. These preliminary user authentication devices determine whether the authorized user detected by the user presence detection device is one of the group of authorized users registered, and once the user is determined to be one of the group of authorized users registered, the biometrics authentication system is powered on and further authenticates the authorized user detected.

In certain embodiments, the biometrics authentication system includes one or more of: a fingerprint authentication sensor, a finger vein authentication sensor, a facial recognition authentication sensor, and a keypad. The fingerprint authentication sensor authenticates the authorized user detected using fingerprint data stored in an authorized user profile storage module. The finger vein authentication sensor authenticates the authorized user detected using finger vein data stored in the authorized user profile storage module. The facial recognition authentication sensor authenticates the authorized user detected using facial recognition data stored in the authorized user profile storage module. The keypad is used for the user to enter his/her personal identification number (PIN). The keypad authenticates the authorized user detected using his/her PIN corresponding to his/her UID data stored in the authorized user profile storage module. Once the user detected is determined to be one of the group of authorized users registered, the biometrics authentication system is powered on and further authenticates the authorized user detected, and the multi-factor authentication electronic lock is operable only when the authorized user detected passes authentication again by the biometrics authentication system.

In certain embodiments, user profile of each of the group of authorized users registered stored in the authorized user profile storage module includes at least: a user's name, a user's contact phone number, a user's email address, a user's handheld mobile communication device MAC address used to authenticate the user detected through the Bluetooth user authentication module, a user's UID used to identify whether the user is one of the group of authorized users registered, a user's PIN used to authenticate the authorized user detected as the authorized user having corresponding UID, a user's fingerprint authentication data used by the fingerprint authentication sensor to authenticate the authorized user detected as one of the group of authorized users registered, a user's finger vein authentication data used by the finger vein authentication sensor to authenticate the authorized user detected as one of the group of authorized users registered, a user's facial recognition authentication data used by the facial recognition authentication sensor to authenticate the authorized user detected as one of the group of authorized users registered, and any combinations of the user profile information.

In certain embodiments, the facial recognition authentication sensor further includes: a speaker, and a multi-colored light emit diode (LED). The speaker is used to prompt the user to move the user's face to certain location such that the facial recognition authentication sensor can acquire one or more images of the user's face in a predetermined range for facial recognition. The LED lights in green indicating that user's face is within the predetermined range for facial recognition; and in red indicating that user's face is not within the predetermined range for facial recognition.

In certain embodiments, the facial recognition authentication sensor further includes a display screen. The display screen is used to assist the user to move the user's face to certain location such that the facial recognition authentication sensor can acquire one or more images of the user's face in the predetermined range for facial recognition.

In certain embodiments, the multi-factor authentication electronic lock controller includes: a processor, and a non-volatile memory storing an operating system and computer executable instructions. The computer executable instructions include: a user detection module, a communication module, a user authentication module, an electrical power module, an authorized user profile storage module, and an electronic lock control module.

In certain embodiments, when executed at the processor, the computer executable instructions cause the processor to perform one or more of operations:

- providing, by the electrical power module and the battery, electrical power to the user presence detection system;
- detecting a user, by the user presence detection device, when the user enters the proximity of the multi-factor authentication electronic lock;
- identifying the detected user, by the preliminary user authentication device, whether the detected user is one of the group of authorized users registered of the multi-factor authentication electronic lock;
- providing, by the electrical power module and the battery, to the rest of the multi-factor authentication electronic lock, when the preliminary user authentication device identifies the detected user is one of the group of authorized users registered;
- authenticating, by the biometrics authentication system, the authorized user detected using biometrics information of the detected user to determine whether the biometrics information of the authorized user detected matches the biometrics information of the authorized user stored in the authorized user profile storage module; and
- operating, by the electronic lock control module, the multi-factor authentication electronic lock only when the authorized user detected is determined by the biometrics authentication system again to be one of the group of authorized users registered.

In certain embodiments, the facial recognition authentication sensor is able to determine whether more than one users are approaching the multi-factor authentication electronic lock. When the multi-factor authentication electronic lock is set up to accept only one user to operate the multi-factor authentication electronic lock, the multi-factor authentication electronic lock can be shut down when the facial recognition authentication sensor determines more than one users are approaching the multi-factor authentication electronic lock.

In certain embodiments, the computer executable instructions of the multi-factor authentication electronic lock controller include: the user detection module, the communication module, the user authentication module, the electrical power module, the authorized user profile storage module, and the electronic lock control module.

In certain embodiments, the user detection module is connected to the user presence detection system and determines whether a user detected in front of the multi-factor authentication electronic lock is one of the group of authorized users registered. The communication module includes at least a Bluetooth module and the Bluetooth module is in communication with the handheld mobile communication device of the authorized user detected to authenticate the authorized user detected. The user authentication module is in communication with the biometrics authentication system to authenticate the authorized user detected using the communication module when the authorized user detected carries the handheld mobile communication device, and to authenticate the authorized user detected using the keypad and the PIN of the authorized user detected when the authorized user detected does not carry the handheld mobile communication device.

In certain embodiments, the electrical power module provides electrical power from the battery to the user presence detection system constantly, and provides electrical power to the rest of the multi-factor authentication electronic lock when the user presence detection system determines the user detected in front of the multi-factor authentication electronic lock is one of the group of authorized users registered. The authorized user profile storage module stores user profiles of the group of authorized users registered, and the user profiles of the group of authorized users registered were entered into the authorized user profile storage module during a registration process. The electronic lock control module controls locking and unlocking of the multi-factor authentication electronic lock only when the detected user is first authenticated by the user presence detection system and authenticated again by the biometrics authentication system to be one of the group of authorized users registered.

In another aspect, the present disclosure relates to a multi-factor authentication electronic lock system. In certain embodiments, the multi-factor authentication electronic lock system includes: a multi-factor authentication electronic lock system server, a communication network, and a group of multi-factor authentication electronic locks. The multi-factor authentication electronic lock system server includes a user profile database. Each of the group of multi-factor authentication electronic locks includes: a user presence detection system, a biometrics authentication system, and a multi-factor authentication electronic lock controller.

In certain embodiment, the multi-factor authentication electronic lock controller includes a battery. The multi-factor authentication electronic lock controller is used to register a group of authorized users, to store user profiles of the group of authorized users registered, and to manage the operation of the multi-factor authentication electronic lock.

In certain embodiment, the user presence detection system is powered by the battery constantly and the user presence detection system detects presence of a user using one of a set of user presence detection devices of the user presence detection system, and preliminarily authenticates the user detected to be one of the group of authorized user registered using one of a set of preliminary user authentication devices of the user presence detection system.

In certain embodiments, the biometrics authentication system further authenticates the authorized user detected using one of a set of biometrics authentication devices, and the biometrics authentication system is powered on after the authorized user has been detected by the user presence detection device and preliminarily authenticated to be one of the group of authorized users registered.

When the user approaches the multi-factor authentication electronic lock, the user presence detection system detects whether the user is one of the group of authorized users registered, once the user is determined to be one of the group of authorized users registered, the biometrics authentication system and the rest of the multi-factor authentication electronic lock are powered on, and the biometrics authentication system further authenticates the authorized user detected, and the multi-factor authentication electronic lock is operable only when the authorized user detected is authenticated again by the biometrics authentication system.

In certain embodiments, the user presence detection system includes: a set of user presence detection devices, and a set of preliminary user authentication devices. The set of user presence detection devices includes: a passive infrared (PIR) motion sensor; a radio frequency doppler (RFD) motion sensor; and a video camera having object detection ability. These user presence detection devices detect that the user is approaching and within a predetermined distance of the multi-factor authentication electronic lock. The set of preliminary user authentication devices includes: a keypad to enter user identification number (UID), and a Bluetooth user authentication module in communication with a handheld mobile communication device of the user detected. These preliminary user authentication devices determine whether the authorized user detected by the user presence detection device is one of the group of authorized users registered, and once the user is determined to be one of the group of authorized users registered, the biometrics authentication system is powered on and further authenticates the authorized user detected.

In certain embodiments, the biometrics authentication system includes one or more of: a fingerprint authentication sensor, a finger vein authentication sensor, a facial recognition authentication sensor, and a keypad. The fingerprint authentication sensor authenticates the authorized user detected using fingerprint data stored in an authorized user profile storage module. The finger vein authentication sensor authenticates the authorized user detected using finger vein data stored in the authorized user profile storage module. The facial recognition authentication sensor authenticates the authorized user detected using facial recognition data stored in the authorized user profile storage module. The keypad is used for the user to enter his/her personal identification number (PIN). The keypad authenticates the authorized user detected using his/her PIN corresponding to his/her UID data stored in the authorized user profile storage module. Once the user detected is determined to be one of the group of authorized users registered, the biometrics authentication system is powered on and further authenticates the authorized user detected, and the multi-factor authentication electronic lock is operable only when the authorized user detected passes authentication again by the biometrics authentication system.

In certain embodiments, user profile of each of the group of authorized users registered stored in the authorized user profile storage module includes at least: a user's name, a user's contact phone number, a user's email address, a user's handheld mobile communication device MAC address used to authenticate the user detected through the Bluetooth user authentication module, a user's UID used to identify whether the user is one of the group of authorized users registered, a user's PIN used to authenticate the authorized user detected as the authorized user having corresponding UID, a user's fingerprint authentication data used by the fingerprint authentication sensor to authenticate the authorized user detected as one of the group of authorized users registered, a user's finger vein authentication data used by the finger vein authentication sensor to authenticate the authorized user detected as one of the group of authorized users registered, a user's facial recognition authentication data used by the facial recognition authentication sensor to authenticate the authorized user detected as one of the group of authorized users registered, and any combinations of the user profile information.

In certain embodiments, the facial recognition authentication sensor further includes: a speaker, and a multi-colored light emit diode (LED). The speaker is used to prompt the user to move the user's face to certain location such that the facial recognition authentication sensor can acquire one or more images of the user's face in a predetermined range for facial recognition. The LED lights in green indicating that user's face is within the predetermined range for facial recognition; and in red indicating that user's face is not within the predetermined range for facial recognition.

In certain embodiments, the facial recognition authentication sensor further includes a display screen. The display screen is used to assist the user to move the user's face to certain location such that the facial recognition authentication sensor can acquire one or more images of the user's face in the predetermined range for facial recognition.

In certain embodiments, the multi-factor authentication electronic lock controller includes: a processor, and a non-volatile memory storing an operating system and computer executable instructions. The computer executable instructions include: a user detection module, a communication module, a user authentication module, an electrical power module, an authorized user profile storage module, and an electronic lock control module.

In certain embodiments, when executed at the processor, the computer executable instructions cause the processor to perform one or more of operations:

providing, by the electrical power module and the battery, electrical power to the user presence detection system;

detecting a user, by the user presence detection device, when the user enters the proximity of the multi-factor authentication electronic lock;

identifying the detected user, by the preliminary user authentication device, whether the detected user is one of the group of authorized users registered of the multi-factor authentication electronic lock;

providing, by the electrical power module and the battery, to the rest of the multi-factor authentication electronic lock, when the preliminary user authentication device identifies the detected user is one of the group of authorized users registered;

authenticating, by the biometrics authentication system, the authorized user detected using biometrics information of the detected user to determine whether the biometrics information of the authorized user detected matches the biometrics information of the authorized user stored in the authorized user profile storage module; and operating, by the electronic lock control module, the multi-factor authentication electronic lock only when the authorized user detected is determined by the biometrics authentication system again to be one of the group of authorized users registered.

In certain embodiments, the facial recognition authentication sensor is able to determine whether more than one users are approaching the multi-factor authentication electronic lock. When the multi-factor authentication electronic lock is set up to accept only one user to operate the multi-factor authentication electronic lock, the multi-factor authentication electronic lock can be shut down when the facial recognition authentication sensor determines more than one users are approaching the multi-factor authentication electronic lock.

In certain embodiments, the computer executable instructions of the multi-factor authentication electronic lock controller include: the user detection module, the communication module, the user authentication module, the electrical power module, the authorized user profile storage module, and the electronic lock control module.

In certain embodiments, the user detection module is connected to the user presence detection system and determines whether a user detected in front of the multi-factor authentication electronic lock is one of the group of authorized users registered. The communication module includes at least a Bluetooth module and the Bluetooth module is in communication with the handheld mobile communication device of the authorized user detected to authenticate the authorized user detected, and a wireless communication module to communicate with the multi-factor authentication electronic lock system server. The user authentication module is in communication with the biometrics authentication system to authenticate the authorized user detected using the communication module when the authorized user detected carries the handheld mobile communication device, and to authenticate the authorized user detected using the keypad and the PIN of the authorized user detected when the authorized user detected does not carry the handheld mobile communication device.

In certain embodiments, the electrical power module provides electrical power from the battery to the user presence detection system constantly, and provides electrical power to the rest of the multi-factor authentication electronic lock when the user presence detection system determines the user detected in front of the multi-factor authentication electronic lock is one of the group of authorized users registered. The authorized user profile storage module stores user profiles of the group of authorized users registered, and the user profiles of the group of authorized users registered were entered into the authorized user profile storage module during a registration process. The electronic lock control module controls locking and unlocking of the multi-factor authentication electronic lock only when the detected user is first authenticated by the user presence detection system and authenticated again by the biometrics authentication system to be one of the group of authorized users registered.

In yet another aspect, the present disclosure relates to a method of using a multi-factor authentication electronic lock system. In certain embodiments, the method of using a multi-factor authentication electronic lock system includes:

installing, by a system administrator, a multi-factor authentication electronic lock system, and using a handheld mobile communication device having at least Bluetooth capability to register a group of authorized users and to enter user profiles of the group of authorized users registered, and the multi-factor authentication electronic lock system includes a multi-factor authentication electronic lock system server having a user profile database, a communication network, and a group of multi-factor authentication electronic locks;

for each of the group of multi-factor authentication electronic locks, providing, by a battery of the multi-factor authentication electronic lock, to a user presence detection system to detect any human objects approaching the multi-factor authentication electronic lock;

detecting, by one of a set of user presence detection devices of the user presence detection system, any human objects approaching the multi-factor authentication electronic lock, and once a user is detected in the predetermined range of the multi-factor authentication electronic lock, authenticating, by one of a set of preliminary user authentication devices of the user presence detection system, the user detected to determine whether the user detected is one of the group of authorized users registered;

when the user detected is determined to be one of the group of authorized users registered, providing electrical power, by the battery of the multi-factor authentication electronic lock, to the rest of the multi-factor authentication electronic lock, and authenticating, by one of a set of preliminary user authentication devices of the user presence detection system; and operating, by an electronic locking mechanism of the multi-factor authentication electronic lock, the multi-factor authentication electronic lock only when the authorized user detected is authenticated again by a biometrics authentication system of the multi-factor authentication electronic lock to be one of the group of authorized users registered.

In certain embodiments, the user presence detection system includes: a set of user presence detection devices, and a set of preliminary user authentication devices. The set of user presence detection devices includes: a passive infrared (PIR) motion sensor; a radio frequency doppler (RFD) motion sensor; and a video camera having object detection ability. These user presence detection devices detect that the user is approaching and within a predetermined distance of the multi-factor authentication electronic lock. The set of preliminary user authentication devices includes: a keypad to enter user identification number (UID), and a Bluetooth user authentication module in communication with a handheld mobile communication device of the authorized user detected. These preliminary user authentication devices determine whether the authorized user detected by the user presence detection device is one of the group of authorized users registered, and once the user is determined to be one of the group of authorized users registered, the biometrics authentication system is powered on and further authenticates the authorized user detected.

In certain embodiments, the biometrics authentication system includes one or more of: a fingerprint authentication sensor, a finger vein authentication sensor, a facial recognition authentication sensor, and a keypad. The fingerprint authentication sensor authenticates the authorized user detected using fingerprint data stored in an authorized user profile storage module. The finger vein authentication sensor authenticates the authorized user detected using finger vein data stored in the authorized user profile storage module. The facial recognition authentication sensor authenticates the authorized user detected using facial recognition data stored in the authorized user profile storage module. The keypad is used for the user to enter his/her personal identification number (PIN). The keypad authenticates the authorized user detected using his/her PIN corresponding to his/her UID data stored in the authorized user profile storage module. Once the user detected is determined to be one of the group of authorized users registered, the biometrics authentication system is powered on and further authenticates the authorized user detected, and the multi-factor authentication electronic lock is operable only when the authorized user detected passes authentication again by the biometrics authentication system.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
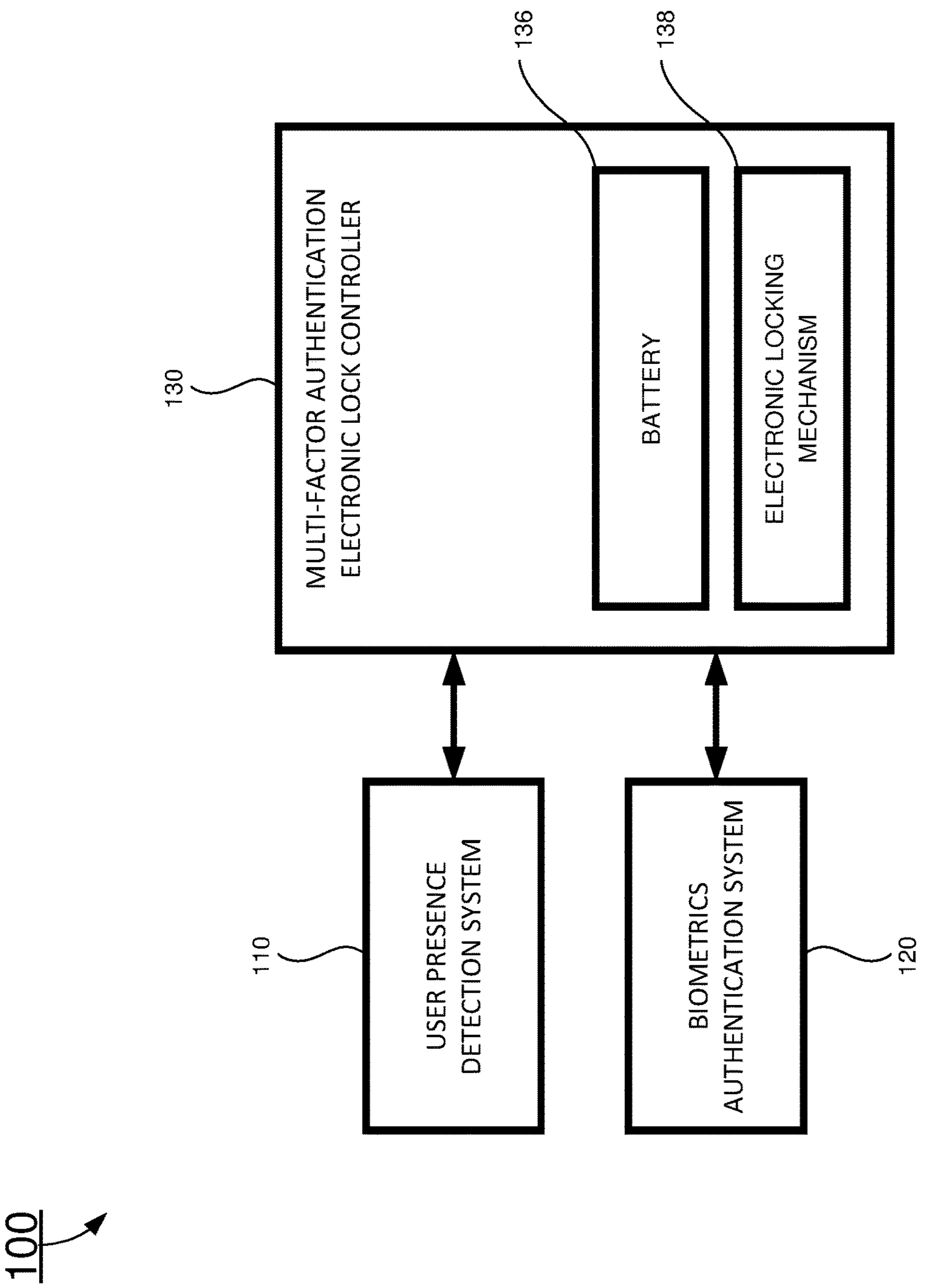
FIG. 1 is a block diagram illustrating a multi-factor authentication electronic lock according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of “a”, “an”, and “the” includes plural reference unless the context clearly dictates otherwise. Also, as used in the description herein and throughout the claims that follow, the meaning of “in” includes “in” and “on” unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, “around”, “about” or “approximately” shall generally mean within 20 percent, preferably within 10 percent, and more preferably within 5 percent of a given value or range. Numerical quantities given herein are approximate, meaning that the term “around”, “about” or “approximately” can be inferred if not expressly stated.

As used herein, “plurality” means two or more.

As used herein, the terms “comprising,” “including,” “carrying,” “having,” “containing,” “involving,” and the like are to be understood to be open-ended, i.e., to mean including but not limited to.

As used herein, the term digital key is defined as a digital code stored in the physical electronic key to electronically operate the electronic lock. The active electronic key may store an active digital key, and the passive electronic key may store a passive digital key. In order to increase security of the electronic lock, these digital keys may be encrypted during the transmission of the digital keys between the electronic keys and the electronic lock.

As used herein, the phrase at least one of A, B, and C should be construed to mean a logical (A or B or C), using a non-exclusive logical OR. It should be understood that one or more steps within a method may be executed in different order (or conventionally) without altering the principles of the present disclosure.

As used herein, the term module may refer to, be part of, or include an Application Specific Integrated Circuit (ASIC); an electronic circuit; a combinational logic circuit; a field programmable gate array (FPGA); an electronic key processor (shared, dedicated, or group) that executes code; other suitable hardware components that provide the described functionality; or a combination of some or all of the above, such as in a system-on-chip. The term module may include memory (shared, dedicated, or group) that stores code executed by the electronic key processor.

The term code, as used above, may include software, firmware, and/or microcode, and may refer to programs, routines, functions, classes, and/or objects. The term shared, as used above, means that some or all code from multiple modules may be executed using a single (shared) electronic key processor. In addition, some or all code from multiple modules may be stored by a single (shared) memory. The term group, as used above, means that some or all code from a single module may be executed using a group of electronic key processors. In addition, some or all code from a single module may be stored using a group of memories.

The apparatuses and methods described herein may be implemented by one or more computer programs executed by one or more electronic key processors. The computer programs include electronic key processor-executable instructions that are stored on a non-transitory tangible computer readable medium. The computer programs may also include stored data. Non-limiting examples of the non-transitory tangible computer readable medium are non-volatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In one aspect, as shown in FIGS. 1-7, present disclosure relates to a standalone multi-factor authentication electronic lock 100. In certain embodiments, the multi-factor authentication electronic lock 100 includes: a user presence detection system 110, a biometrics authentication system 120, and a multi-factor authentication electronic lock controller 130.

In certain embodiment, the multi-factor authentication electronic lock controller 130 includes a battery 136. The multi-factor authentication electronic lock controller 130 is used to register a group of authorized users, to store user profiles of the group of authorized users registered, and to manage the operation of the multi-factor authentication electronic lock 100.

In certain embodiment, the user presence detection system 110 detects presence of a user using one of a set of user presence detection devices 112 of the user presence detection system 110, and preliminarily authenticates the user detected to be one of the group of authorized user registered using one of a set of preliminary user authentication devices 114 of the user presence detection system 110. In certain embodiments, the biometrics authentication system 120 further authenticates the authorized user detected using one of a set of biometrics authentication devices 120, and the biometrics authentication system 120 is powered on after the authorized user has been detected by the user presence detection device 112 and preliminarily authenticated to be one of the group of authorized users registered.

The user presence detection system 110 is powered by the battery 136 constantly, and the rest of the multi-factor authentication electronic lock 100 including the biometrics authentication system 120 and the multi-factor authentication electronic lock controller 130 are only powered up between the time when the user presence detection system 110 preliminarily determines that a user detected by the user presence detection system 110 is one of the group of authorized user registered, and the completion of operation of the multi-factor authentication electronic lock 100. Once the operation of the multi-factor authentication electronic lock 100 is completed, the rest of the multi-factor authentication electronic lock 100 including the biometrics authentication system 120 and the multi-factor authentication electronic lock controller 130 are powered off to save the electrical power and prolong the life of the battery 136.

In certain embodiments, when the user approaches the multi-factor authentication electronic lock 100, the user presence detection system 110 detects whether the user is one of the group of authorized users registered, once the user is determined to be one of the group of authorized users registered, the biometrics authentication system 120 and the rest of the multi-factor authentication electronic lock 100 are powered on, and the biometrics authentication system 120 further authenticates the authorized user detected. The multi-factor authentication electronic lock 100 is operable only when the authorized user detected is authenticated again by the biometrics authentication system 120.

Figure 3:
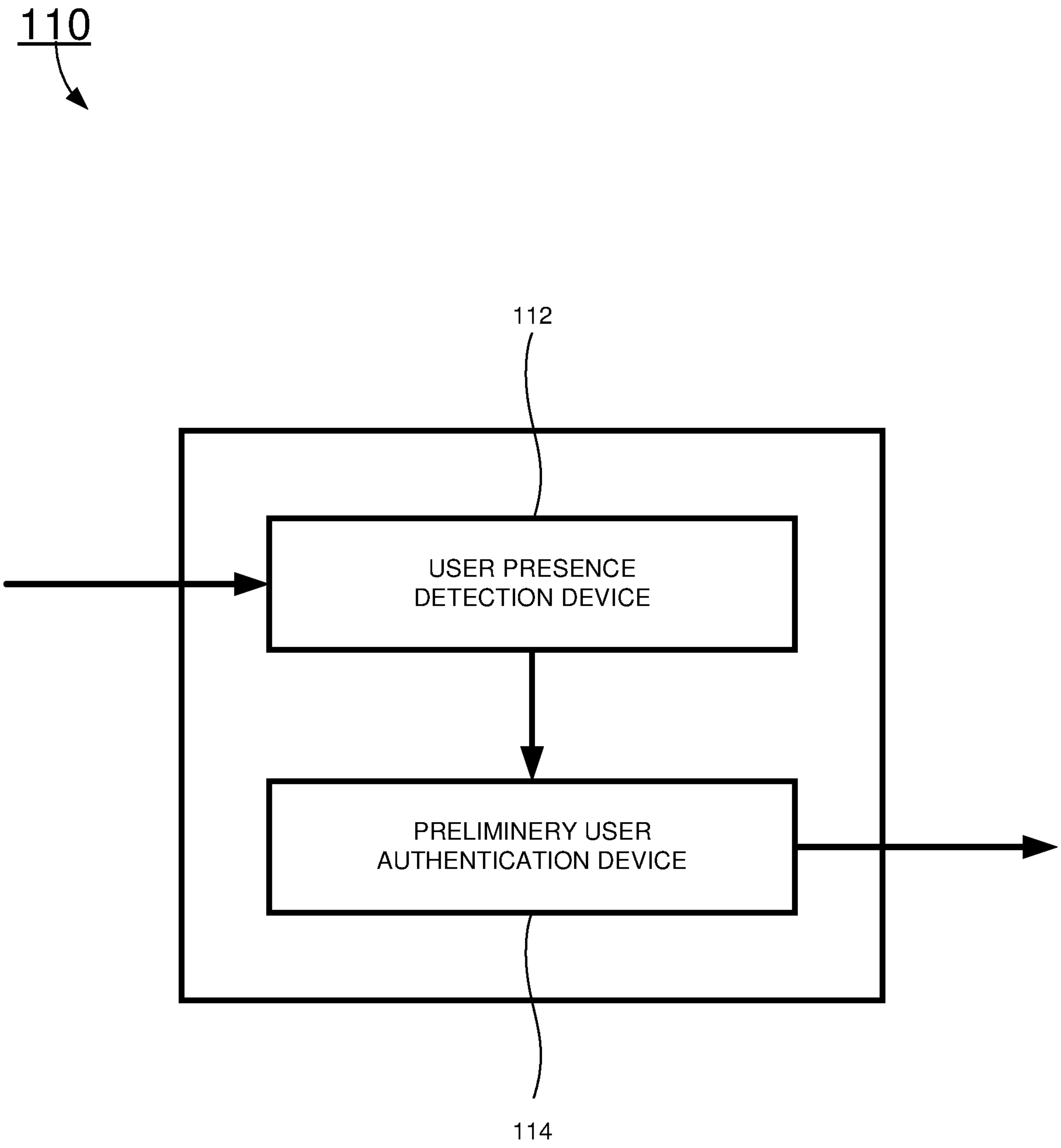
FIG. 3 is a block diagram illustrating a user presence detection system of the multi-factor authentication electronic lock according to certain embodiments of the present disclosure.
Figure 4:
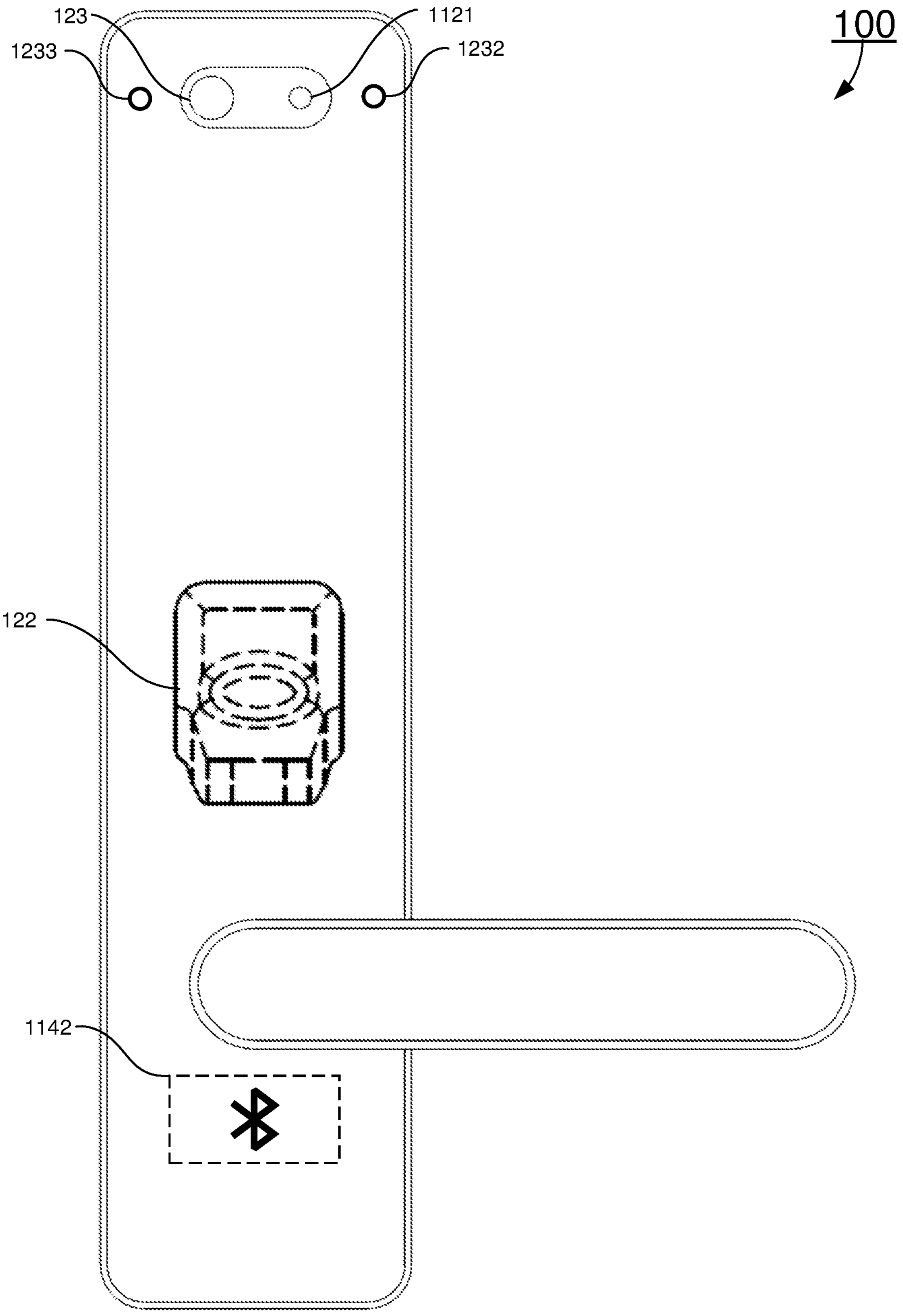
FIG. 4 is a front view of the multi-factor authentication electronic lock according to one embodiment of the present disclosure.
Figure 5:
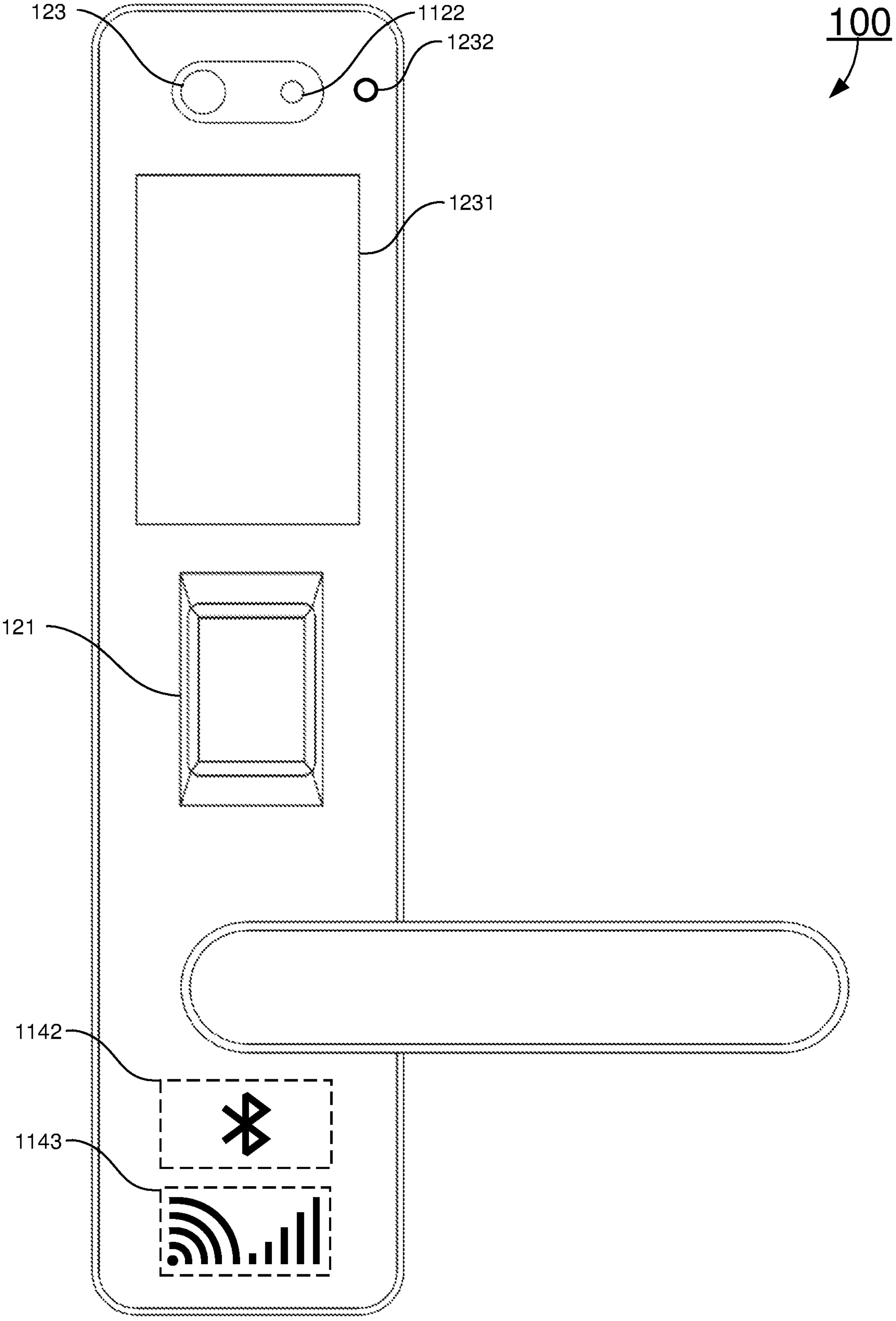
FIG. 5 is a front view of the multi-factor authentication electronic lock according to another embodiment of the present disclosure.
Figure 6:
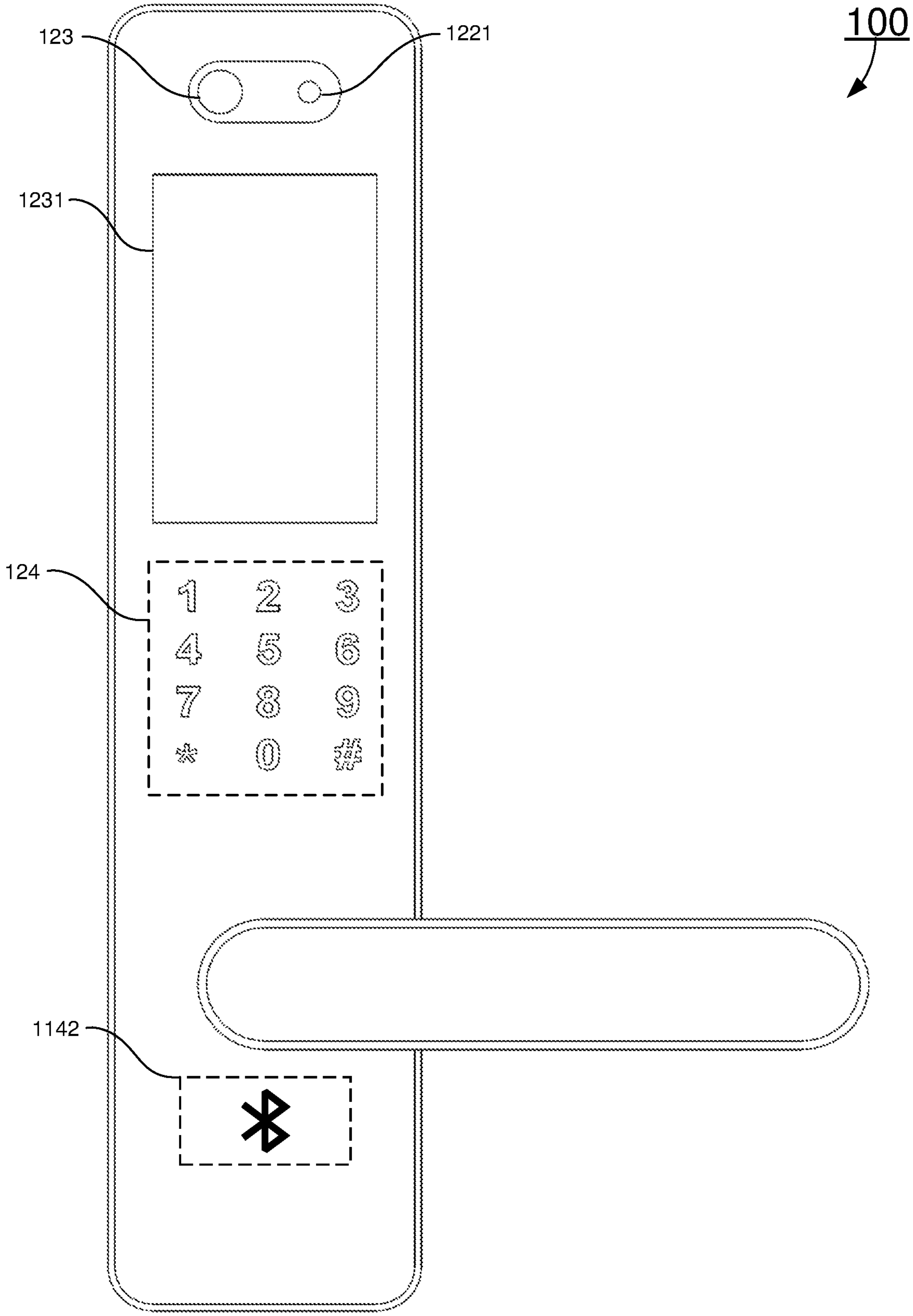
FIG. 6 is a front view of the multi-factor authentication electronic lock according to yet another embodiment of the present disclosure.

In certain embodiments, as shown in FIG. 3, the user presence detection system 110 includes: a set of user presence detection devices 112, and a set of preliminary user authentication devices 114. The set of user presence detection devices 112 includes: a passive infrared (PIR) motion sensor 1121, as shown in FIG. 4, a radio frequency doppler (RFD) motion sensor 1122, as shown in FIG. 5, and a video camera having object detection ability 1123, as shown in FIG. 4 and FIG. 5. These user presence detection devices 112 detect that the user is approaching and within a predetermined distance of the multi-factor authentication electronic lock 100. The set of preliminary user authentication devices 114 includes: a keypad 124 to enter user identification number (UID), as shown in FIG. 6, and a Bluetooth user authentication module 1142 in communication with a handheld mobile communication device 201 of the user detected, as shown in FIGS. 4-6. The handheld mobile communication device 201 generally includes: an iOS based iPhone 2011, and an Android based mobile phone 2012. These handheld mobile communication devices 201 all includes a Bluetooth module such as the Bluetooth module 20111 in the iOS based iPhone 2011, and the Bluetooth module 20121 in the Android based mobile phone 2012. These Bluetooth modules 20111 and 20121 are used to preliminarily determine that whether the user approaching the multi-factor authentication electronic lock 100 is one of the group of authorized users registered.

In certain embodiments, when the user does not carry the handheld mobile communication device 201 having the Bluetooth module, the user may use the keypad 124 to enter his/her UID to pass the preliminary authentication using the user presence detection system 110. Once the user is determined to be one of the group of authorized users registered, the biometrics authentication system 120 is powered on and further authenticates the authorized user detected.

In certain embodiments, the biometrics authentication system 120 includes one or more of: a fingerprint authentication sensor 121 as shown in FIG. 5, a finger vein authentication sensor 122, as shown in FIG. 4, a facial recognition authentication sensor 123, as shown in FIGS. 4-6, and the keypad 124, as shown in FIG. 6. The fingerprint authentication sensor 121 authenticates the authorized user detected using fingerprint data stored in an authorized user profile storage module 13445. The finger vein authentication sensor 122 authenticates the authorized user detected using finger vein data stored in the authorized user profile storage module 13445. The facial recognition authentication sensor 123 authenticates the authorized user detected using facial recognition data stored in the authorized user profile storage module 13445.

In certain embodiments, when the user does not carry the handheld mobile communication device 201 having the Bluetooth module, the keypad 124 may be used for the user to enter his/her PIN for the second authentication using the biometrics authentication system 120. The keypad 124 authenticates the authorized user detected using his/her PIN corresponding to his/her UID data stored in the authorized user profile storage module 13445.

In certain embodiments, once the user detected is determined to be one of the group of authorized users registered, the biometrics authentication system 120 is powered on and further authenticates the authorized user detected. The multi-factor authentication electronic lock 100 is operable only when the authorized user detected passes authentication again by the biometrics authentication system 120. This second authentication enhance the security of the multi-factor authentication electronic lock 100.

In certain embodiments, user profile of each of the group of authorized users registered stored in the authorized user profile storage module 13445 includes at least: a user's name, a user's contact phone number, a user's email address, a user's handheld mobile communication device MAC address used to authenticate the user detected through the Bluetooth user authentication module 1142, a user's UID used to identify whether the user is one of the group of authorized users registered, a user's PIN used to authenticate the authorized user detected as the authorized user having corresponding UID, a user's fingerprint authentication data used by the fingerprint authentication sensor 121 to authenticate the authorized user detected as one of the group of authorized users registered, a user's finger vein authentication data used by the finger vein authentication sensor 122 to authenticate the authorized user detected as one of the group of authorized users registered, a user's facial recognition authentication data used by the facial recognition authentication sensor 123 to authenticate the authorized user detected as one of the group of authorized users registered, and any combinations of the user profile information. The user profile of each of the group of authorized users registered stored in the authorized user profile storage module 13445 is entered during a registration process.

In certain embodiments, the facial recognition authentication sensor 123 further includes: a speaker 1233, and a multi-colored light emit diode (LED) 1232, as shown in FIG. 4 and FIG. 5. When the facial recognition authentication sensor 123 does not include a display screen, the speaker 1233 is used to prompt the user to move the user's face to certain location such that the facial recognition authentication sensor 123 can acquire one or more images of the user's face in a predetermined range for facial recognition. The LED 1232 may be used to indicate whether the user's face is within the predetermined range for facial recognition. The LED 1232 lights in green indicating that the user's face is within the predetermined range for facial recognition; and the LED 1232 lights in red indicating that user's face is not within the predetermined range for facial recognition.

In certain embodiments, as shown in FIGS. 5 and 6, the facial recognition authentication sensor 123 further includes a display screen 1231. The display screen 1231 may be used to assist the user to move the user's face to certain location such that the facial recognition authentication sensor 123 can acquire one or more images of the user's face in the predetermined range for facial recognition.

Figure 2:
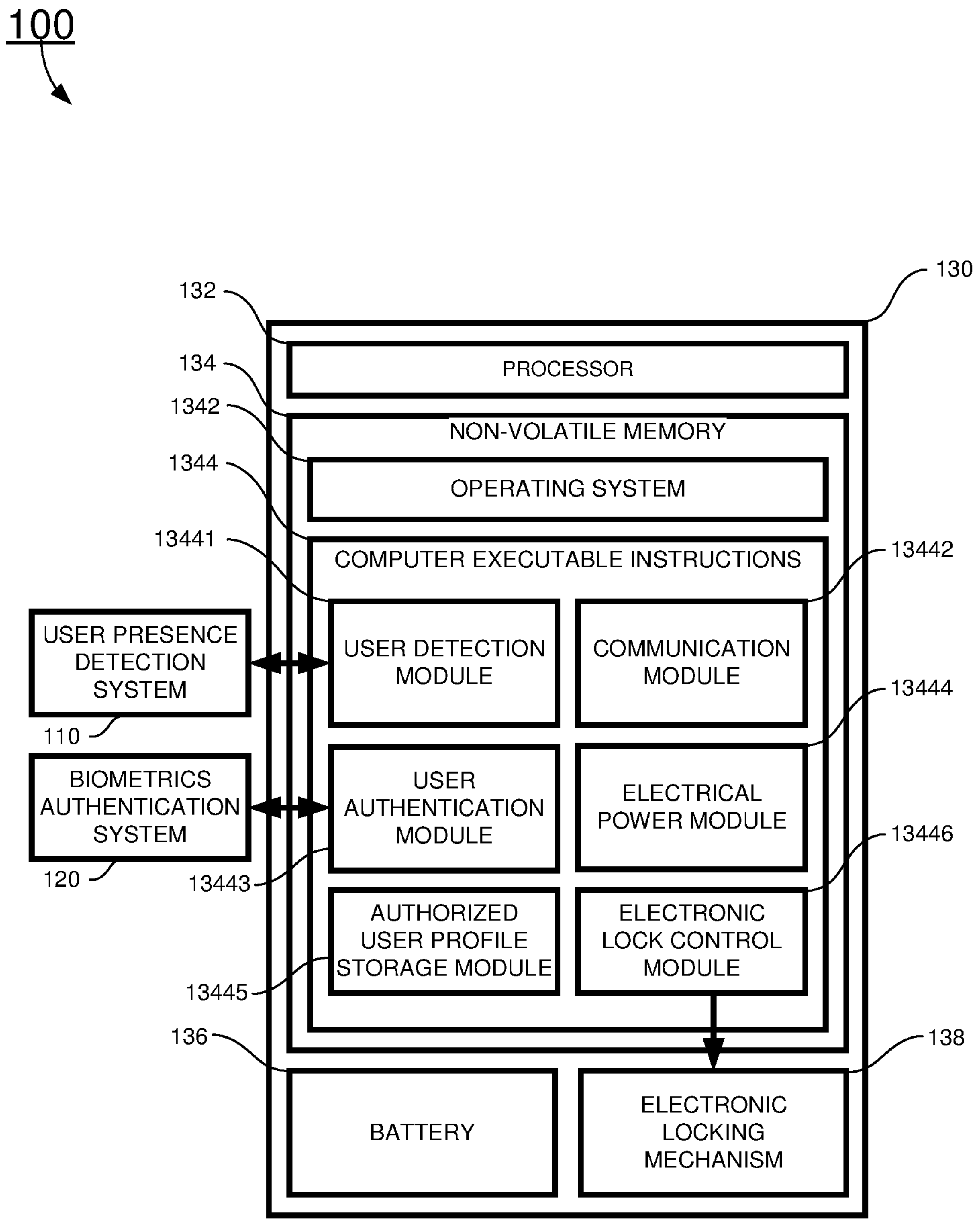
FIG. 2 is a more detailed block diagram illustrating the multi-factor authentication electronic lock according to certain embodiments of the present disclosure.

In certain embodiments, as shown in FIG. 2, the multi-factor authentication electronic lock controller 130 includes: a processor 132, and a non-volatile memory 134 storing an operating system 1342 and computer executable instructions 1344. The computer executable instructions 1344 include: a user detection module 13441, a communication module 13442, a user authentication module 13443, an electrical power module 13444, an authorized user profile storage module 13445, and an electronic lock control module 13446.

In certain embodiments, when executed at the processor 132, the computer executable instructions 1344 cause the processor 132 to perform one or more of operations:

- providing, by the electrical power module 13444 and the battery 136, electrical power to the user presence detection system 110;
- detecting a user, by the user presence detection device 112, when the user enters the proximity of the multi-factor authentication electronic lock 100;
- identifying the detected user, by the preliminary user authentication device 114, whether the detected user is one of the group of authorized users registered of the multi-factor authentication electronic lock 100;
- providing, by the electrical power module 13444 and the battery 136, to the rest of the multi-factor authentication electronic lock 100, when the preliminary user authentication device 114 identifies the detected user is one of the group of authorized users registered;
- authenticating, by the biometrics authentication system 120, the authorized user detected using biometrics information of the detected user to determine whether the biometrics information of the authorized user detected matches the biometrics information of the authorized user stored in the authorized user profile storage module 13445; and
- operating, by the electronic lock control module 13446, the multi-factor authentication electronic lock 100 only when the authorized user detected is determined by the biometrics authentication system 120 again to be one of the group of authorized users registered.

In certain embodiments, in order to enhance the security of the multi-factor authentication electronic lock 100, especially in a situation when the user is forced by another person to open the multi-factor authentication electronic lock 100, the facial recognition authentication sensor 123 is able to determine whether more than one users are approaching the multi-factor authentication electronic lock 100. When the multi-factor authentication electronic lock 100 is set up to accept only one user to operate the multi-factor authentication electronic lock 100, the multi-factor authentication electronic lock 100 can be shut down when the facial recognition authentication sensor 123 determines more than one users are approaching the multi-factor authentication electronic lock 100.

In certain embodiments, the computer executable instructions 1344 of the multi-factor authentication electronic lock controller 130 include: the user detection module 13441, the communication module 13442, the user authentication module 13443, the electrical power module 13444, the authorized user profile storage module 13445, and the electronic lock control module 13446.

In certain embodiments, the user detection module 13441 is connected to the user presence detection system 110 and determines whether a user detected in front of the multi-factor authentication electronic lock 100 is one of the group of authorized users registered. The communication module 13442 includes at least a Bluetooth module and the Bluetooth module is in communication with the handheld mobile communication device 201 of the authorized user detected to authenticate the authorized user detected, and a wireless communication module 1143 to communicate with the multi-factor authentication electronic lock system server 12. The user authentication module 13443 is in communication with the biometrics authentication system 120 to authenticate the authorized user detected using the communication module 13442 when the authorized user detected carries the handheld mobile communication device 201, and to authenticate the authorized user detected using the keypad 124 and the PIN of the authorized user detected when the authorized user detected does not carry the handheld mobile communication device 201.

In certain embodiments, the electrical power module 13444 provides electrical power from the battery 136 to the user presence detection system 110 constantly, and provides electrical power to the rest of the multi-factor authentication electronic lock 100 when the user presence detection system 110 determines the user detected in front of the multi-factor authentication electronic lock 100 is one of the group of authorized users registered. The authorized user profile storage module 13445 stores user profiles of the group of authorized users registered, and the user profiles of the group of authorized users registered were entered into the authorized user profile storage module 13445 during a registration process. The electronic lock control module 13446 controls locking and unlocking of the multi-factor authentication electronic lock 100 only when the detected user is first authenticated by the user presence detection system 110 and authenticated again by the biometrics authentication system 120 to be one of the group of authorized users registered.

Figure 8:
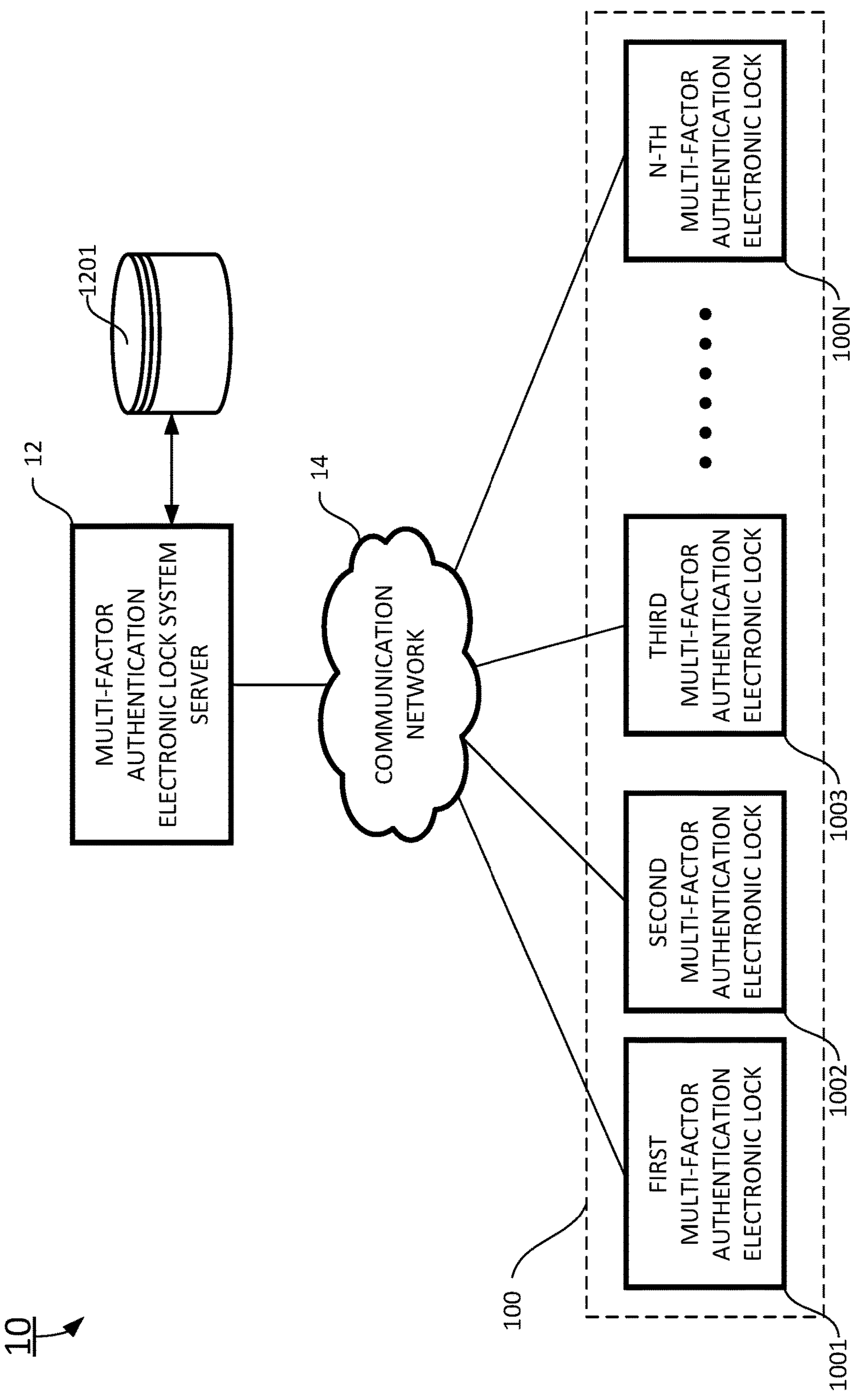
FIG. 8 is a block diagram of an exemplary multi-factor authentication electronic lock system according to certain embodiments of the present disclosure.

In another aspect, as shown in FIG. 8, the present disclosure relates to a multi-factor authentication electronic lock system 10. In certain embodiments, the multi-factor authentication electronic lock system 10 includes: a multi-factor authentication electronic lock system server 12, a communication network 14, and a group of multi-factor authentication electronic locks 100. The multi-factor authentication electronic lock system server 12 includes a user profile database 1201. In certain embodiments, the group of multi-factor authentication electronic locks 100 includes: a first multi-factor authentication electronic lock 1001, a second multi-factor authentication electronic lock 1002, a third multi-factor authentication electronic lock 1003, . . . , and an N-th multi-factor authentication electronic lock 100N. Each of the group of multi-factor authentication electronic locks 100 includes a communication module 1143, as shown in FIG. 5, and each of the group of multi-factor authentication electronic locks 100 is connected to the multi-factor authentication electronic lock system server 12 through the communication network 14. In certain embodiments, the communication network 14 includes at least one of a Wi-Fi network, a Bluetooth network, an infrared network, a Zigbee network, a wireless local area network (WLAN), a wireless metropolitan area network (WMAN), a wireless wide area network (WWAN), a cellular network, and a mobile communication network.

In certain embodiment, as shown in FIG. 1 and FIG. 2, each of the group of multi-factor authentication electronic locks 100 includes: a user presence detection system 110, a biometrics authentication system 120, and a multi-factor authentication electronic lock controller 130. The multi-factor authentication electronic lock controller 130 includes a battery 136. The multi-factor authentication electronic lock controller 130 is used to register a group of authorized users, to store user profiles of the group of authorized users registered, and to manage the operation of the multi-factor authentication electronic lock 100.

In certain embodiment, the user presence detection system 110 detects presence of a user using one of a set of user presence detection devices 112 of the user presence detection system 110, and preliminarily authenticates the user detected to be one of the group of authorized user registered using one of a set of preliminary user authentication devices 114 of the user presence detection system 110. In certain embodiments, the biometrics authentication system 120 further authenticates the authorized user detected using one of a set of biometrics authentication devices 120, and the biometrics authentication system 120 is powered on after the authorized user has been detected by the user presence detection device 112 and preliminarily authenticated to be one of the group of authorized users registered.

The user presence detection system 110 is powered by the battery 136 constantly, and the rest of the multi-factor authentication electronic lock 100 including the biometrics authentication system 120 and the multi-factor authentication electronic lock controller 130 are only powered up between the time when the user presence detection system 110 preliminarily determines that a user detected by the user presence detection system 110 is one of the group of authorized user registered, and the completion of operation of the multi-factor authentication electronic lock 100. Once the operation of the multi-factor authentication electronic lock 100 is completed, the rest of the multi-factor authentication electronic lock 100 including the biometrics authentication system 120 and the multi-factor authentication electronic lock controller 130 are powered off to save the electrical power and prolong the life of the battery 136.

In certain embodiments, when the user approaches the multi-factor authentication electronic lock 100, the user presence detection system 110 detects whether the user is one of the group of authorized users registered, once the user is determined to be one of the group of authorized users registered, the biometrics authentication system 120 and the rest of the multi-factor authentication electronic lock 100 are powered on, and the biometrics authentication system 120 further authenticates the authorized user detected. The multi-factor authentication electronic lock 100 is operable only when the authorized user detected is authenticated again by the biometrics authentication system 120.

Figure 7:
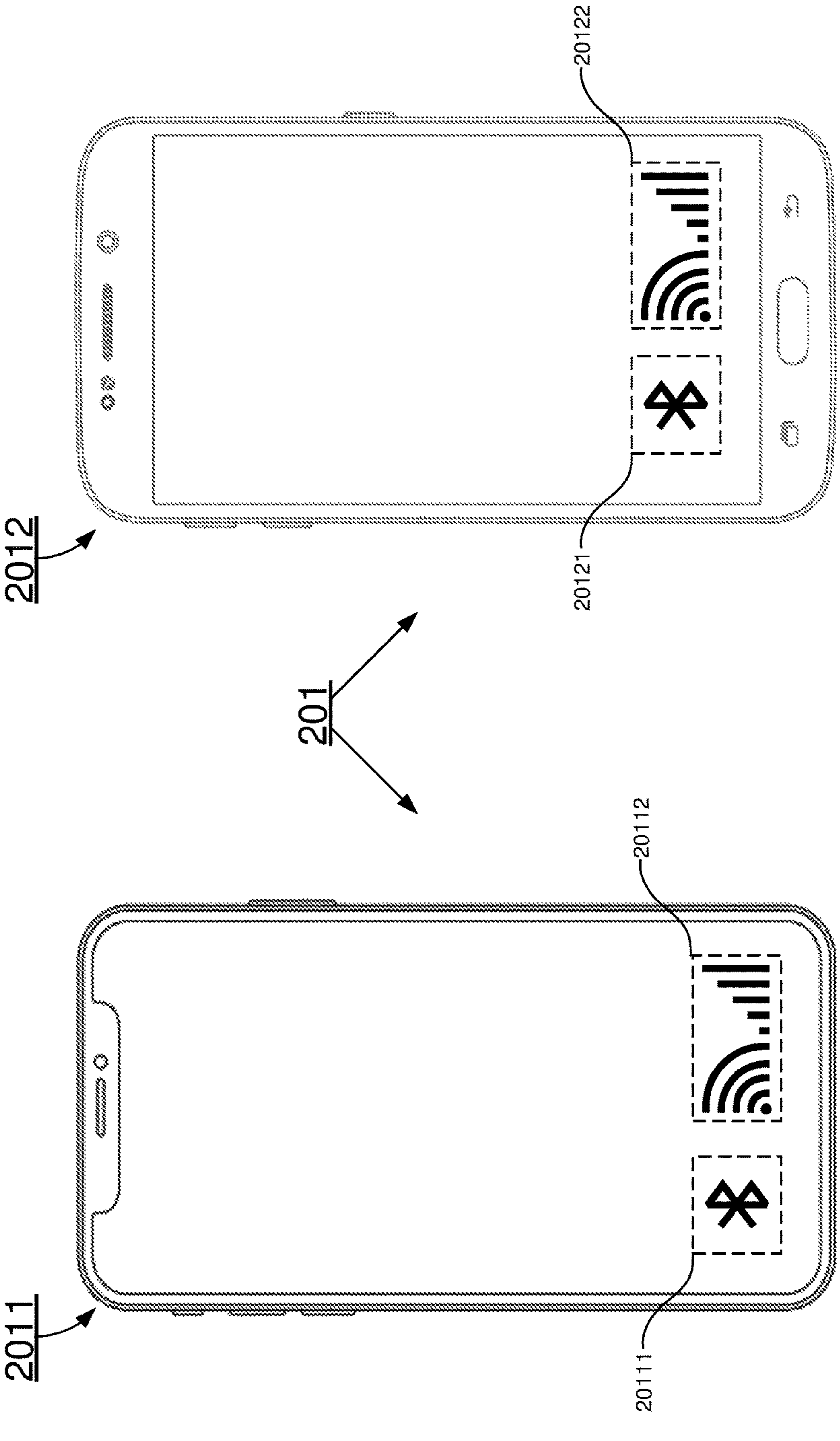
FIG. 7 shows two exemplary handheld mobile communication devices used to operate the multi-factor authentication electronic lock according to certain embodiments of the present disclosure.

In certain embodiments, as shown in FIG. 3, the user presence detection system 110 includes: a set of user presence detection devices 112, and a set of preliminary user authentication devices 114. The set of user presence detection devices 112 includes: a passive infrared (PIR) motion sensor 1121, as shown in FIG. 4, a radio frequency doppler (RFD) motion sensor 1122, as shown in FIG. 5, and a video camera having object detection ability 1123, as shown in FIG. 4 and FIG. 5. These user presence detection devices 112 detect that the user is approaching and within a predetermined distance of the multi-factor authentication electronic lock 100. The set of preliminary user authentication devices 114 includes: a keypad 124 to enter user identification number (UID), as shown in FIG. 6, and a Bluetooth user authentication module 1142 in communication with a handheld mobile communication device 201 of the user detected, as shown in FIG. 7. The handheld mobile communication device 201 generally includes: an iOS based iPhone 2011, and an Android based mobile phone 2012. These handheld mobile communication devices 201 all includes a Bluetooth module such as the Bluetooth module 20111 in the iOS based iPhone 2011, and the Bluetooth module 20121 in the Android based mobile phone 2012. These Bluetooth modules 20111 and 20121 are used to preliminarily determine that whether the user approaching the multi-factor authentication electronic lock 100 is one of the group of authorized users registered.

In certain embodiments, when the user does not carry the handheld mobile communication device 201 having the Bluetooth module, the user may use the keypad 124 to enter his/her UID to pass the preliminary authentication using the user presence detection system 110. Once the user is determined to be one of the group of authorized users registered, the biometrics authentication system 120 is powered on and further authenticates the authorized user detected.

In certain embodiments, the biometrics authentication system 120 includes one or more of: a fingerprint authentication sensor 121 as shown in FIG. 5, a finger vein authentication sensor 122, as shown in FIG. 4, a facial recognition authentication sensor 123, as shown in FIGS. 4-6, and the keypad 124, as shown in FIG. 6. The fingerprint authentication sensor 121 authenticates the authorized user detected using fingerprint data stored in an authorized user profile storage module 13445. The finger vein authentication sensor 122 authenticates the authorized user detected using finger vein data stored in the authorized user profile storage module 13445. The facial recognition authentication sensor 123 authenticates the authorized user detected using facial recognition data stored in the authorized user profile storage module 13445.

In certain embodiments, when the user does not carry the handheld mobile communication device 201 having the Bluetooth module, the keypad 124 may be used for the user to enter his/her PIN for the second authentication using the biometrics authentication system 120. The keypad 124 authenticates the authorized user detected using his/her PIN corresponding to his/her UID data stored in the authorized user profile storage module 13445.

In certain embodiments, once the user detected is determined to be one of the group of authorized users registered, the biometrics authentication system 120 is powered on and further authenticates the authorized user detected. The multi-factor authentication electronic lock 100 is operable only when the authorized user detected passes authentication again by the biometrics authentication system 120. This second authentication enhance the security of the multi-factor authentication electronic lock 100.

In certain embodiments, user profile of each of the group of authorized users registered stored in the authorized user profile storage module 13445 includes at least: a user's name, a user's contact phone number, a user's email address, a user's handheld mobile communication device MAC address used to authenticate the user detected through the Bluetooth user authentication module 1142, a user's UID used to identify whether the user is one of the group of authorized users registered, a user's PIN used to authenticate the authorized user detected as the authorized user having corresponding UID, a user's fingerprint authentication data used by the fingerprint authentication sensor 121 to authenticate the authorized user detected as one of the group of authorized users registered, a user's finger vein authentication data used by the finger vein authentication sensor 122 to authenticate the authorized user detected as one of the group of authorized users registered, a user's facial recognition authentication data used by the facial recognition authentication sensor 123 to authenticate the authorized user detected as one of the group of authorized users registered, and any combinations of the user profile information. The user profile of each of the group of authorized users registered stored in the authorized user profile storage module 13445 is entered during a registration process. Each of the group of multi-factor authentication electronic locks 100 has a user profile, and these user profiles of the group of multi-factor authentication electronic locks 100 are stored in the authorized user profile storage module 13445 of corresponding multi-factor authentication electronic lock 100, and also stored in a user profile database 1201 connected to the multi-factor authentication electronic lock system server 12.

In certain embodiments, the facial recognition authentication sensor 123 further includes: a speaker 1233, and a multi-colored light emit diode (LED) 1232, as shown in FIG. 4. When the facial recognition authentication sensor 123 does not include a display screen, the speaker 1233 is used to prompt the user to move the user's face to certain location such that the facial recognition authentication sensor 123 can acquire one or more images of the user's face in a predetermined range for facial recognition. The LED 1232 may be used to indicate whether the user's face is within the predetermined range for facial recognition. The LED 1232 lights in green indicating that the user's face is within the predetermined range for facial recognition; and the LED 1232 lights in red indicating that user's face is not within the predetermined range for facial recognition.

In certain embodiments, as shown in FIGS. 5 and 6, the facial recognition authentication sensor 123 further includes a display screen 1231. The display screen 1231 may be used to assist the user to move the user's face to certain location such that the facial recognition authentication sensor 123 can acquire one or more images of the user's face in the predetermined range for facial recognition.

In certain embodiments, as shown in FIG. 2, the multi-factor authentication electronic lock controller 130 includes: a processor 132, and a non-volatile memory 134 storing an operating system 1342 and computer executable instructions 1344. The computer executable instructions 1344 include: a user detection module 13441, a communication module 13442, a user authentication module 13443, an electrical power module 13444, an authorized user profile storage module 13445, and an electronic lock control module 13446.

In certain embodiments, when executed at the processor 132, the computer executable instructions 1344 cause the processor 132 to perform one or more of operations:

providing, by the electrical power module 13444 and the battery 136, electrical power to the user presence detection system 110;

detecting a user, by the user presence detection device 112, when the user enters the proximity of the multi-factor authentication electronic lock 100;

identifying the detected user, by the preliminary user authentication device 114, whether the detected user is one of the group of authorized users registered of the multi-factor authentication electronic lock 100;

providing, by the electrical power module 13444 and the battery 136, to the rest of the multi-factor authentication electronic lock 100, when the preliminary user authentication device 114 identifies the detected user is one of the group of authorized users registered;

authenticating, by the biometrics authentication system 120, the authorized user detected using biometrics information of the detected user to determine whether the biometrics information of the authorized user detected matches the biometrics information of the authorized user stored in the authorized user profile storage module 13445; and operating, by the electronic lock control module 13446, the multi-factor authentication electronic lock 100 only when the authorized user detected is determined by the biometrics authentication system 120 again to be one of the group of authorized users registered.

In certain embodiments, in order to enhance the security of the multi-factor authentication electronic lock 100, especially in a situation when the user is forced by another person to open the multi-factor authentication electronic lock 100, the facial recognition authentication sensor 123 is able to determine whether more than one users are approaching the multi-factor authentication electronic lock 100. When the multi-factor authentication electronic lock 100 is set up to accept only one user to operate the multi-factor authentication electronic lock 100, the multi-factor authentication electronic lock 100 can be shut down when the facial recognition authentication sensor 123 determines more than one users are approaching the multi-factor authentication electronic lock 100.

In certain embodiments, the computer executable instructions 1344 of the multi-factor authentication electronic lock controller 130 include: the user detection module 13441, the communication module 13442, the user authentication module 13443, the electrical power module 13444, the authorized user profile storage module 13445, and the electronic lock control module 13446.

In certain embodiments, the user detection module 13441 is connected to the user presence detection system 110 and determines whether a user detected in front of the multi-factor authentication electronic lock 100 is one of the group of authorized users registered. The communication module 13442 includes at least a Bluetooth module and the Bluetooth module is in communication with the handheld mobile communication device 201 of the authorized user detected to authenticate the authorized user detected, and a wireless communication module 1143 to communicate with the multi-factor authentication electronic lock system server 12. The user authentication module 13443 is in communication with the biometrics authentication system 120 to authenticate the authorized user detected using the communication module 13442 when the authorized user detected carries the handheld mobile communication device 201, and to authenticate the authorized user detected using the keypad 124 and the PIN of the authorized user detected when the authorized user detected does not carry the handheld mobile communication device 201.

In certain embodiments, the electrical power module 13444 provides electrical power from the battery 136 to the user presence detection system 110 constantly, and provides electrical power to the rest of the multi-factor authentication electronic lock 100 when the user presence detection system 110 determines the user detected in front of the multi-factor authentication electronic lock 100 is one of the group of authorized users registered. The authorized user profile storage module 13445 stores user profiles of the group of authorized users registered, and the user profiles of the group of authorized users registered were entered into the authorized user profile storage module 13445 during a registration process. The electronic lock control module 13446 controls locking and unlocking of the multi-factor authentication electronic lock 100 only when the detected user is first authenticated by the user presence detection system 110 and authenticated again by the biometrics authentication system 120 to be one of the group of authorized users registered.

In yet another aspect, the present disclosure relates to a method of using a multi-factor authentication electronic lock system 10. In certain embodiments, the method of using a multi-factor authentication electronic lock system 10 includes:

installing, by a system administrator, a multi-factor authentication electronic lock system 10, and using a handheld mobile communication device having at least Bluetooth capability to register a group of authorized users and to enter user profiles of the group of authorized users registered, and the multi-factor authentication electronic lock system 10 includes a multi-factor authentication electronic lock system server 12 having a user profile database 1201, a communication network 14, and a group of multi-factor authentication electronic locks 100;

for each of the group of multi-factor authentication electronic locks 100, providing, by a battery 136 of the multi-factor authentication electronic lock 100, to a user presence detection system 110 to detect any human objects approaching the multi-factor authentication electronic lock 100;

detecting, by one of a set of user presence detection devices 112 of the user presence detection system 110, any human objects approaching the multi-factor authentication electronic lock 100, and once a user is detected in the predetermined range of the multi-factor authentication electronic lock 100, authenticating, by one of a set of preliminary user detection devices 114 of the user presence detection system 110, the user detected to determine whether the user detected is one of the group of authorized users registered;

when the user detected is determined to be one of the group of authorized users registered, providing electrical power, by the battery 136 of the multi-factor authentication electronic lock 100, to the rest of the multi-factor authentication electronic lock 100, and authenticating, by one of a set of biometrics user authentication devices of the biometrics authentication system 120; and operating, by an electronic locking mechanism 138 of the multi-factor authentication electronic lock 100, the multi-factor authentication electronic lock 100 only when the authorized user detected is authenticated again by a biometrics authentication system 120 of the multi-factor authentication electronic lock 100 to be one of the group of authorized users registered.

In certain embodiments, the user presence detection system 110 includes: a set of user presence detection devices 112, and a set of preliminary user authentication devices 114. The set of user presence detection devices 112 includes: a passive infrared (PIR) motion sensor 1121; a radio frequency doppler (RFD) motion sensor 1122; and a video camera having object detection ability 1123. These user presence detection devices 112 detect that the user is approaching and within a predetermined distance of the multi-factor authentication electronic lock 100. The set of preliminary user authentication devices 114 includes: a keypad 1141 to enter user identification number (UID), and a Bluetooth user authentication module 1142 in communication with a handheld mobile communication device 201 of the user detected. These preliminary user authentication devices 114 determine whether the authorized user detected by the user presence detection device 112 is one of the group of authorized users registered, and once the user is determined to be one of the group of authorized users registered, the biometrics authentication system 120 is powered on and further authenticates the authorized user detected.

In certain embodiments, the biometrics authentication system 120 includes one or more of: a fingerprint authentication sensor 121, a finger vein authentication sensor 122, a facial recognition authentication sensor 123, and a keypad 124. The fingerprint authentication sensor 121 authenticates the authorized user detected using fingerprint data stored in an authorized user profile storage module 13445. The finger vein authentication sensor 122 authenticates the authorized user detected using finger vein data stored in the authorized user profile storage module 13445. The facial recognition authentication sensor 123 authenticates the authorized user detected using facial recognition data stored in the authorized user profile storage module 13445. The keypad 124 is used for the user to enter his/her personal identification number (PIN). The keypad 124 authenticates the authorized user detected using his/her PIN corresponding to his/her UID data stored in the authorized user profile storage module 13445. Once the user detected is determined to be one of the group of authorized users registered, the biometrics authentication system 120 is powered on and further authenticates the authorized user detected, and the multi-factor authentication electronic lock 100 is operable only when the authorized user detected passes authentication again by the biometrics authentication system 120.

Figure 9:
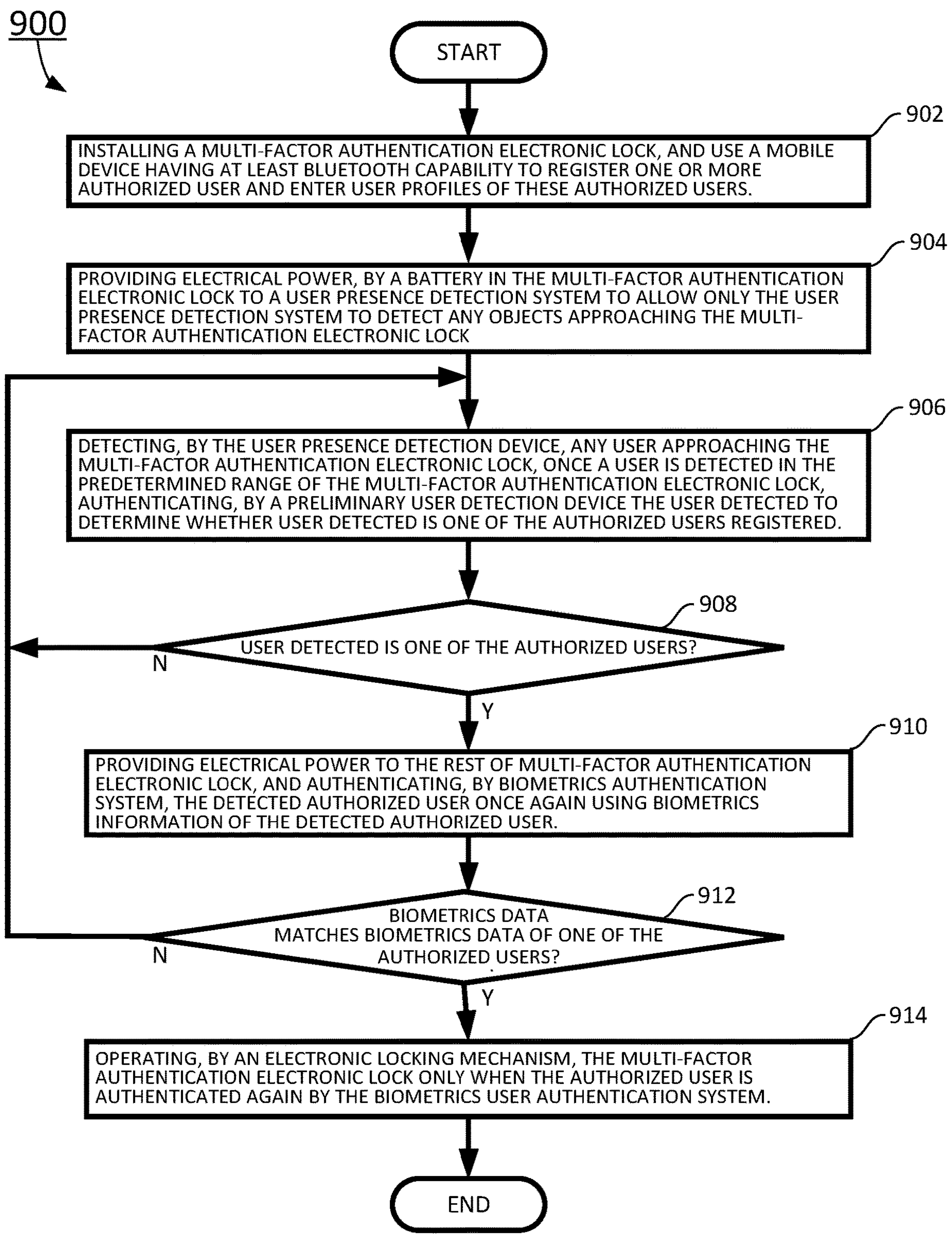
FIG. 9 shows a flowchart of a method of using the multi-factor authentication electronic lock system according to certain embodiments of the present disclosure.

Referring now to FIG. 9, a flowchart of the method 900 using a multi-factor authentication electronic lock system 10 to operate one of the multi-factor authentication electronic lock 100 is shown according to certain embodiments of the present disclosure.

At block 902, a multi-factor authentication electronic lock system 10 is installed by a system administrator, and using a handheld mobile communication device having at least Bluetooth capability to register a group of authorized users for each of the group of multi-factor authentication electronic locks 100 and to enter user profiles of the group of authorized users registered for each of the group of multi-factor authentication electronic locks 100. The multi-factor authentication electronic lock system 10 includes a multi-factor authentication electronic lock system server 12 having a user profile database 1201, a communication network 14, and a group of multi-factor authentication electronic locks 100.

At block 904, for each of the group of multi-factor authentication electronic locks 100, providing, by a battery 136 of the multi-factor authentication electronic lock 100, to a user presence detection system 110 to detect any human objects approaching the multi-factor authentication electronic lock 100.

At block 906, any human objects approaching the multi-factor authentication electronic lock 100 will be detected by one of a set of user presence detection devices 112 of the user presence detection system 110, and once a user is detected in the predetermined range of the multi-factor authentication electronic lock 100, the user detected is authenticated by one of a set of preliminary user detection devices 114 of the user presence detection system 110 to determine whether the user detected is one of the group of authorized users registered.

At query block 908, the preliminary user detection devices 114 of the user presence detection system 110 determines whether the user detected is one of the group of authorized users registered. When the preliminary user detection devices 114 of the user presence detection system 110 determines that the user detected is one of the group of authorized users registered, method proceeds to block 910. When the preliminary user detection devices 114 of the user presence detection system 110 determines that the user detected is not one of the group of authorized users registered, method proceeds to block 906.

At block 910, when the preliminary user detection devices 114 of the user presence detection system 110 determines that the user detected is one of the group of authorized users registered providing electrical power, the rest of the multi-factor authentication electronic lock 100 including the biometrics authentication system 120 and the multi-factor authentication electronic lock controller 130 is powered on by the battery 136 of the multi-factor authentication electronic lock 100, and the authorized user detected is authenticated again by the biometrics authentication system 120.

At query block 912, the biometrics authentication system 120 authenticate the authorized user detected again to determine whether the biometrics data of the authorized user detected matches the biometrics data of one of the group of authorized users registered. When the biometrics authentication system 120 determines that the biometrics data of the authorized user detected matches the biometrics data of one of the group of authorized users registered, the method proceeds to block 914. Otherwise, the method proceeds to block 906.

At block 914, when the biometrics authentication system 120 determines that the biometrics data of the authorized user detected matches the biometrics data of one of the group of authorized users registered, the multi-factor authentication electronic lock 100 can be operated by an electronic locking mechanism 138 of the multi-factor authentication electronic lock 100 only when the authorized user detected is authenticated again by the biometrics authentication system 120 of the multi-factor authentication electronic lock 100.

Such a method reduces the electrical power consumption of the multi-factor authentication electronic lock 100, prolongs the life of the battery used to power the multi-factor authentication electronic lock 100, and enhances the security of the multi-factor authentication electronic lock 100 by performing multi-factor authentication.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A multi-factor authentication electronic lock, comprising:

a multi-factor authentication electronic lock controller, wherein the multi-factor authentication electronic lock controller includes a battery, and is used to register a plurality of authorized users, to store user profiles of the plurality of authorized users registered, and to manage the operation of the multi-factor authentication electronic lock;

a user presence detection system, wherein the user presence detection system is powered by the battery constantly and the user presence detection system detects presence of a user using one of a plurality of user presence detection devices of the user presence detection system, and preliminarily authenticates the user detected to be one of the plurality of authorized user registered using one of a set of preliminary user authentication devices of the user presence detection system; and a biometrics authentication system, wherein the biometrics authentication system further authenticates the authorized user detected using one of a plurality of biometrics authentication devices, and the biometrics authentication system and the rest of the multi-factor authentication electronic lock are powered on after the authorized user has been detected by the user presence detection device and preliminarily determined to be one of the plurality of authorized users registered, wherein the biometrics authentication system comprises at least: a facial recognition authentication sensor, wherein the facial recognition authentication sensor authenticates the authorized user detected using facial recognition data stored in the authorized user profile storage module, the facial recognition authentication sensor further comprises: a speaker, wherein the speaker is used to prompt the user to move the user's face to certain location such that the facial recognition authentication sensor can acquire one or more images of the user's face in a predetermined range for facial recognition, a multi-colored light emit diode (LED), wherein the LED lights in green indicating that user's face is within the predetermined range for facial recognition; and in red indicating that user's face is not within the predetermined range for facial recognition, and a display screen, wherein the display screen is used to assist the user to move the user's face to certain location such that the facial recognition authentication sensor can acquire one or more images of the user's face in the predetermined range for facial recognition, wherein when a user approaches the multi-factor authentication electronic lock, the user presence detection system detects whether the user is one of the plurality of authorized users registered, once the user is determined to be one of the plurality of authorized users registered, the biometrics authentication system is powered on and further authenticates the authorized user detected, and the multi-factor authentication electronic lock is operable only when the authorized user detected is authenticated again by the biometrics authentication system.

2. The multi-factor authentication electronic lock according to claim 1, wherein the user presence detection system comprises:

the plurality of user presence detection devices, wherein the plurality of user presence detection devices comprises: a passive infrared (PIR) motion sensor; a radio frequency doppler (RFD) motion sensor; and a video camera having object detection ability, and the user presence detection device detects that the user is approaching and within a predetermined distance of the multi-factor authentication electronic lock; and the plurality of preliminary user authentication devices, wherein the preliminary user authentication devices comprises: a keypad to enter user identification number (UID), and a Bluetooth user authentication module in communication with a handheld mobile communication device of the user detected, and the preliminary user authentication device determines whether the authorized user detected by the user presence detection device is one of the plurality of authorized users registered, and once the user is determined to be one of the plurality of authorized users registered, the biometrics authentication system is powered on and further authenticates the authorized user detected.

3. The multi-factor authentication electronic lock according to claim 2, wherein the biometrics authentication system further comprises one or more of:

a fingerprint authentication sensor, wherein the fingerprint authentication sensor authenticates the authorized user detected using fingerprint data stored in an authorized user profile storage module;

a finger vein authentication sensor, wherein the finger vein authentication sensor authenticates the authorized user detected using finger vein data stored in the authorized user profile storage module;

the facial recognition authentication sensor, wherein the facial recognition authentication sensor authenticates the authorized user detected using facial recognition data stored in the authorized user profile storage module; and a keypad for the user to enter his/her personal identification number (PIN), wherein the keypad authenticates the authorized user detected using his/her PIN corresponding to his/her UID data stored in the authorized user profile storage module, wherein once the user detected is determined to be one of the plurality of authorized users registered, the biometrics authentication system is powered on and further authenticates the authorized user detected, and the multi-factor authentication electronic lock is operable only when the authorized user detected passes authentication again by the biometrics authentication system.

4. The multi-factor authentication electronic lock according to claim 3, wherein user profile of each of the plurality of authorized users registered stored in the authorized user profile storage module comprises at least:

a user's name;

a user's contact phone number;

a user's email address;

a user's handheld mobile communication device MAC address, wherein the handheld mobile communication device MAC address is used to authenticate the user detected through the Bluetooth user authentication module;

a user's UID, wherein the user's UID is used to identify whether the user is one of the plurality of authorized users registered;

a user's PIN, wherein the user's PIN is used to authenticate the authorized user detected as the authorized user having corresponding UID;

a user's fingerprint authentication data, wherein the user's fingerprint authentication data is used by the fingerprint authentication sensor to authenticate the authorized user detected as one of the plurality of authorized users registered;

a user's finger vein authentication data, wherein the user's finger vein authentication data is used by the finger vein authentication sensor to authenticate the authorized user detected as one of the plurality of authorized users registered;

a user's facial recognition authentication data, wherein the user's facial recognition authentication data is used by the facial recognition authentication sensor to authenticate the authorized user detected as one of the plurality of authorized users registered; and any combinations thereof.

5. The multi-factor authentication electronic lock according to claim 4, wherein the multi-factor authentication electronic lock controller comprises:

a processor, and a non-volatile memory storing an operating system and computer executable instructions, wherein the computer executable instructions comprise: a user detection module, a communication module, a user authentication module, an electrical power module, an authorized user profile storage module, and an electronic lock control module, wherein when executed at the processor, the computer executable instructions cause the processor to perform one or more of operations:

providing, by the electrical power module and the battery, electrical power to the user presence detection system;

detecting a user, by the user presence detection device, when the user enters the proximity of the multi-factor authentication electronic lock;

identifying the detected user, by the preliminary user authentication device, whether the detected user is one of the plurality of authorized users registered of the multi-factor authentication electronic lock;

providing, by the electrical power module and the battery, to the rest of the multi-factor authentication electronic lock, when the preliminary user authentication device identifies the detected user is one of the plurality of authorized users registered;

authenticating, by the biometrics authentication system, the authorized user detected using biometrics information of the detected user to determine whether the biometrics information of the authorized user detected matches the biometrics information of the authorized user stored in the authorized user profile storage module; and operating, by the electronic lock control module, the multi-factor authentication electronic lock only when the authorized user detected is determined by the biometrics authentication system again to be one of the plurality of authorized users registered.

6. The multi-factor authentication electronic lock according to claim 5, wherein the facial recognition authentication sensor is able to determine whether more than one users are approaching the multi-factor authentication electronic lock, and the multi-factor authentication electronic lock can be shut down when the multi-factor authentication electronic lock is set up to accept only one user to operate the multi-factor authentication electronic lock.

7. The multi-factor authentication electronic lock according to claim 4, wherein the computer executable instructions of the multi-factor authentication electronic lock controller comprise:

the user detection module, wherein the user detection module is connected to the user presence detection system and determines whether a user detected in front of the multi-factor authentication electronic lock is one of the plurality of authorized users registered;

the communication module, wherein the communication module comprises at least a Bluetooth module and the Bluetooth module is in communication with the handheld mobile communication device of the authorized user detected to authenticate the authorized user detected;

the user authentication module, wherein user authentication module is in communication with the biometrics authentication system to authenticate the authorized user detected using the communication module when the authorized user detected carries the handheld mobile communication device, and to authenticate the authorized user detected using the keypad and the PIN of the authorized user detected when the authorized user detected does not carry the handheld mobile communication device;

the electrical power module, wherein the electrical power module provides electrical power from the battery to the user presence detection system constantly, and provides electrical power to the rest of the multi-factor authentication electronic lock when the user presence detection system determines the user detected in front of the multi-factor authentication electronic lock is one of the plurality of authorized users registered;

the authorized user profile storage module, wherein the authorized user profile storage module stores user profiles of the plurality of authorized users registered, and the user profiles of the plurality of authorized users registered were entered into the authorized user profile storage module during a registration process; and the electronic lock control module, wherein the electronic lock control module controls locking and unlocking of the multi-factor authentication electronic lock only when the detected user is first authenticated by the user presence detection system and authenticated again by the biometrics authentication system to be one of the plurality of authorized users registered.

8. A multi-factor authentication electronic lock system, comprising:

a multi-factor authentication electronic lock system server, wherein the multi-factor authentication electronic lock system server comprises a user profile database;

a communication network; and a plurality of multi-factor authentication electronic locks, wherein each of the plurality of multi-factor authentication electronic locks comprises:

a multi-factor authentication electronic lock controller, wherein the multi-factor authentication electronic lock controller includes a battery, and is used to register a plurality of authorized users, to store user profiles of the plurality of authorized users registered, and to manage the operation of the multi-factor authentication electronic lock;

a user presence detection system, wherein the user presence detection system is powered by the battery constantly and the user presence detection system detects presence of a user using one of a plurality of user presence detection devices of the user presence detection system, and preliminarily authenticates the user detected to be one of the plurality of authorized user registered using one of a set of preliminary user authentication devices of the user presence detection system; and a biometrics authentication system, wherein the biometrics authentication system further authenticates the authorized user detected using one of a plurality of biometrics authentication devices, and the biometrics authentication system is powered on after the authorized user has been detected by the user presence detection device and preliminarily determined to be one of the plurality of authorized users registered, wherein the biometrics authentication system comprises at least: a facial recognition authentication sensor, wherein the facial recognition authentication sensor authenticates the authorized user detected using facial recognition data stored in the authorized user profile storage module, the facial recognition authentication sensor further comprises: a speaker, wherein the speaker is used to prompt the user to move the user's face to certain location such that the facial recognition authentication sensor can acquire one or more images of the user's face in a predetermined range for facial recognition, a multi-colored light emit diode (LED), wherein the LED lights in green indicating that user's face is within the predetermined range for facial recognition; and in red indicating that user's face is not within the predetermined range for facial recognition, and a display screen, wherein the display screen is used to assist the user to move the user's face to certain location such that the facial recognition authentication sensor can acquire one or more images of the user's face in the predetermined range for facial recognition, when the user approaches the multi-factor authentication electronic lock, the user presence detection system detects whether the user is one of the plurality of authorized users registered, once the user is determined to be one of the plurality of authorized users registered, the biometrics authentication system is powered on and further authenticates the authorized user detected, and the multi-factor authentication electronic lock is operable only when the authorized user detected is authenticated again by the biometrics authentication system.

9. The multi-factor authentication electronic lock system according to claim 8, wherein the user presence detection system comprises:

a plurality of user presence detection devices, wherein the plurality of user presence detection devices comprises: a passive infrared (PIR) motion sensor; a radio frequency doppler (RFD) motion sensor; and a video camera having object detection ability, and the user presence detection device detects that the user is approaching and within a predetermined distance of the multi-factor authentication electronic lock; and a plurality of preliminary user authentication devices, wherein the preliminary user authentication devices comprises: a keypad to enter user identification number (UID), and a Bluetooth user authentication module in communication with a handheld mobile communication device of the user detected, and these preliminary user authentication devices determine whether the authorized user detected by the user presence detection device is one of the plurality of authorized users registered, and once the user is determined to be one of the plurality of authorized users registered, the biometrics authentication system is powered on and further authenticates the authorized user detected.

10. The multi-factor authentication electronic lock system according to claim 9, wherein the biometrics authentication system further comprises one or more of:

a fingerprint authentication sensor, wherein the fingerprint authentication sensor authenticates the authorized user detected using fingerprint data stored in an authorized user profile storage module;

a finger vein authentication sensor, wherein the finger vein authentication sensor authenticates the authorized user detected using finger vein data stored in the authorized user profile storage module;

the facial recognition authentication sensor, wherein the facial recognition authentication sensor authenticates the authorized user detected using facial recognition data stored in the authorized user profile storage module; and a keypad for the user to enter his/her personal identification number (PIN), wherein the keypad authenticates the authorized user detected using his/her PIN corresponding to his/her UID data stored in the authorized user profile storage module, wherein once the user detected is determined to be one of the plurality of authorized users registered, the biometrics authentication system is powered on and further authenticates the authorized user detected, and the multi-factor authentication electronic lock is operable only when the authorized user detected passes authentication again by the biometrics authentication system.

11. The multi-factor authentication electronic lock system according to claim 10, wherein user profile of each of the plurality of authorized users registered stored in the authorized user profile storage module comprises at least:

a user's name;

a user's contact phone number;

a user's email address;

a user's handheld mobile communication device MAC address, wherein the handheld mobile communication device MAC address is used to authenticate the user detected through the Bluetooth user authentication module;

a user's UID, wherein the user's UID is used to identify whether the user is one of the plurality of authorized users registered;

a user's PIN, wherein the user's PIN is used to authenticate the authorized user detected as the authorized user having corresponding UID;

a user's fingerprint authentication data, wherein the user's fingerprint authentication data is used by the fingerprint authentication sensor to authenticate the authorized user detected as one of the plurality of authorized users registered;

a user's finger vein authentication data, wherein the user's finger vein authentication data is used by the finger vein authentication sensor to authenticate the authorized user detected as one of the plurality of authorized users registered;

a user's facial recognition authentication data, wherein the user's facial recognition authentication data is used by the facial recognition authentication sensor to authenticate the authorized user detected as one of the plurality of authorized users registered; and any combinations thereof, and wherein the user profile of each of the plurality of authorized users registered is transmitted to a user profile database of the multi-factor authentication electronic lock system server when the communication network is available.

12. The multi-factor authentication electronic lock system according to claim 11, wherein the multi-factor authentication electronic lock controller comprises:

a processor, and a non-volatile memory storing an operating system and computer executable instructions, wherein the computer executable instructions comprise: a user detection module, a communication module, a user authentication module, an electrical power module, an authorized user profile storage module, and an electronic lock control module, wherein when executed at the processor, the computer executable instructions cause the processor to perform one or more of operations:

providing, by the electrical power module and the battery, electrical power to the user presence detection system;

detecting a user, by the user presence detection device, when the user enters the proximity of the multi-factor authentication electronic lock;

identifying the detected user, by the preliminary user authentication device, whether the detected user is one of the plurality of authorized users registered of the multi-factor authentication electronic lock;

providing, by the electrical power module and the battery, to the rest of the multi-factor authentication electronic lock, when the preliminary user authentication device identifies the detected user is one of the plurality of authorized users registered;

authenticating, by the biometrics authentication system, the authorized user detected using biometrics information of the detected user to determine whether the biometrics information of the authorized user detected matches the biometrics information of the authorized user stored in the authorized user profile storage module; and operating, by the electronic lock control module, the multi-factor authentication electronic lock only when the authorized user detected is determined by the biometrics authentication system again to be one of the plurality of authorized users registered.

13. The multi-factor authentication electronic lock system according to claim 12, wherein the facial recognition authentication sensor is able to determine whether more than one users are approaching the multi-factor authentication electronic lock, and the multi-factor authentication electronic lock can be shut down when the multi-factor authentication electronic lock is set up to accept only one user to operate the multi-factor authentication electronic lock.

14. The multi-factor authentication electronic lock system according to claim 12, wherein the computer executable instructions of the multi-factor authentication electronic lock controller comprise:

the user detection module, wherein the user detection module is connected to the user presence detection system and determines whether a user detected in front of the multi-factor authentication electronic lock is one of the plurality of authorized users registered;

the communication module, wherein the communication module comprises at least a Bluetooth module and the Bluetooth module is in communication with the handheld mobile communication device of the authorized user detected to authenticate the authorized user detected, and a wireless communication module to communicate with the multi-factor authentication electronic lock system server;

the user authentication module, wherein user authentication module is in communication with the biometrics authentication system to authenticate the authorized user detected using the communication module when the authorized user detected carries the handheld mobile communication device, and to authenticate the authorized user detected using the keypad and the PIN of the authorized user detected when the authorized user detected does not carry the handheld mobile communication device;

the electrical power module, wherein the electrical power module provides electrical power from the battery to the user presence detection system constantly, and provides electrical power to the rest of the multi-factor authentication electronic lock when the user presence detection system determines the user detected in front of the multi-factor authentication electronic lock is one of the plurality of authorized users registered;

the authorized user profile storage module, wherein the authorized user profile storage module stores user profiles of the plurality of authorized users registered, and the user profiles of the plurality of authorized users registered were entered into the authorized user profile storage module during a registration process; and the electronic lock control module, wherein the electronic lock control module controls locking and unlocking of the multi-factor authentication electronic lock only when the detected user is first authenticated by the user presence detection system and authenticated again by the biometrics authentication system to be one of the plurality of authorized users registered.

15. A method of using a multi-factor authentication electronic lock system, comprising:

installing, by a system administrator, a multi-factor authentication electronic lock system, and using a handheld mobile communication device having at least Bluetooth capability to register a plurality of authorized users and to enter user profiles of the plurality of authorized users registered, wherein the multi-factor authentication electronic lock system comprises a multi-factor authentication electronic lock system server having a user profile database, a communication network, and a plurality of multi-factor authentication electronic locks;

for each of the plurality of multi-factor authentication electronic locks, providing, by a battery of the multi-factor authentication electronic lock, to a user presence detection system to detect any human objects approaching the multi-factor authentication electronic lock;

detecting, by one of a plurality of user presence detection devices of the user presence detection system, any human objects approaching the multi-factor authentication electronic lock, and once a user is detected in the predetermined range of the multi-factor authentication electronic lock, authenticating, by one of a plurality of preliminary user authentication devices of the user presence detection system, the user detected to determine whether the user detected is one of the plurality of authorized users registered;

when the user detected is determined to be one of the plurality of authorized users registered, providing electrical power, by the battery of the multi-factor authentication electronic lock, to the rest of the multi-factor authentication electronic lock, and authenticating, by one of a plurality of biometrics user authentication devices of a biometrics authentication system, wherein the biometrics authentication system comprises at least: a facial recognition authentication sensor, wherein the facial recognition authentication sensor authenticates the authorized user detected using facial recognition data stored in the authorized user profile storage module, the facial recognition authentication sensor further comprises: a speaker, wherein the speaker is used to prompt the user to move the user's face to certain location such that the facial recognition authentication sensor can acquire one or more images of the user's face in a predetermined range for facial recognition, a multi-colored light emit diode (LED), wherein the LED lights in green indicating that user's face is within the predetermined range for facial recognition; and in red indicating that user's face is not within the predetermined range for facial recognition, and a display screen, wherein the display screen is used to assist the user to move the user's face to certain location such that the facial recognition authentication sensor can acquire one or more images of the user's face in the predetermined range for facial recognition; and operating, by an electronic locking mechanism of the multi-factor authentication electronic lock, the multi-factor authentication electronic lock only when the authorized user detected is authenticated again by a biometrics authentication system of the multi-factor authentication electronic lock to be one of the plurality of authorized users registered.

16. The method according to claim 15, wherein the user presence detection system comprises:

a plurality of user presence detection devices, wherein the plurality of user presence detection devices comprises: a passive infrared (PIR) motion sensor; a radio frequency doppler (RFD) motion sensor; and a video camera having object detection ability, and the user presence detection device detects that the user is approaching and within a predetermined distance of the multi-factor authentication electronic lock; and a plurality of preliminary user authentication devices, wherein the preliminary user authentication devices comprises: a keypad to enter user identification number (UID), and a Bluetooth user authentication module in communication with a handheld mobile communication device of the user detected, and these preliminary user authentication devices determine whether the authorized user detected by the user presence detection device is one of the plurality of authorized users registered, and once the user is determined to be one of the plurality of authorized users registered, the biometrics authentication system is powered on and further authenticates the authorized user detected; and the biometrics authentication system further comprises one or more of:

a fingerprint authentication sensor, wherein the fingerprint authentication sensor authenticates the authorized user detected using fingerprint data stored in an authorized user profile storage module;

a finger vein authentication sensor, wherein the finger vein authentication sensor authenticates the authorized user detected using finger vein data stored in the authorized user profile storage module;

the facial recognition authentication sensor, wherein the facial recognition authentication sensor authenticates the authorized user detected using facial recognition data stored in the authorized user profile storage module; and a keypad for the user to enter his/her personal identification number (PIN), wherein the keypad authenticates the authorized user detected using his/her PIN corresponding to his/her UID data stored in the authorized user profile storage module, wherein once the user detected is determined to be one of the plurality of authorized users registered, the biometrics authentication system is powered on and further authenticates the authorized user detected, and the multi-factor authentication electronic lock is operable only when the authorized user detected passes authentication again by the biometrics authentication system.

* * * * *